(12) United States Patent  
Galati et al.

(10) Patent No.: US 11,132,364 B1  
(45) Date of Patent: Sep. 28, 2021

(54) RANGE OVERLAP QUERY RESPONSE SYSTEM FOR GRAPH DATA

(71) Applicant: SAS Institute Inc., Cary, NC (US)

(72) Inventors: Matthew Victor Galati, Glen Mills, PA (US); Brandon Michael Reese, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/225,228

(22) Filed: Apr. 8, 2021

Related U.S. Application Data

(60) Provisional application No. 63/088,439, filed on Oct. 6, 2020, provisional application No. 63/058,429, filed on Jul. 29, 2020.

(51) Int. Cl.
    *G06F 16/2453* (2019.01)
    *G06F 16/2455* (2019.01)
    *G06F 16/901* (2019.01)

(52) U.S. Cl.
    CPC .. *G06F 16/24537* (2019.01); *G06F 16/24554* (2019.01); *G06F 16/9024* (2019.01)

(58) Field of Classification Search
    None
    See application file for complete search history.

(56) References Cited

U.S. PATENT DOCUMENTS

| 8,533,182 B1* | 9/2013 | Charboneau | G06F 16/90335 |
| | | | 707/718 |
| 9,576,007 B1* | 2/2017 | Sivathanu | G06F 16/2228 |
| 2015/0054831 A1* | 2/2015 | Grandhi | G06F 16/904 |
| | | | 345/440 |
| 2017/0161282 A1* | 6/2017 | Kemme | G06F 9/542 |
| 2020/0311565 A1* | 10/2020 | Beller | G06N 5/022 |

OTHER PUBLICATIONS

Sarkar, Dipanjan; "Continuous Numeric Data: Strategies for working with continuous, numerical data"; published on Jan. 4, 2018 ; retrieved on Jun. 3, 2021 from https://towardsdatascience.com/understanding-feature-engineering-part-1-continuous-numeric-data-da4e47099a7b (Year: 2018).*

(Continued)

*Primary Examiner* — Tony Mahmoudi  
*Assistant Examiner* — Umar Mian  
(74) *Attorney, Agent, or Firm* — Bell & Manning, LLC

(57) ABSTRACT

A computing system determines a response to a query. A bin start value and a bin stop value is defined for each bin based on an input bin option. End nodes are split based on the bin start value and the bin stop value of each bin to define a second plurality of end nodes. Each start node of a plurality of start nodes that is connected to each end node of the second plurality of end nodes is identified based on the respective link attributes of a plurality of link attributes. Overlapping start nodes of the plurality of start nodes that overlap at an end node of the second plurality of end nodes are identified based on a predefined overlap query graph that defines a connectivity to identify between a start node and the end node. The identified overlapping start nodes are output as a response to the predefined overlap query graph.

30 Claims, 13 Drawing Sheets

(56) References Cited

OTHER PUBLICATIONS

How to check for time range overlap in Cypher—Neo4J Graph Database Platform, 2020, https://neo4i.com/developer/kb/how-to-check-time-range-overlap, 3 pages.

SAS Visual Data Mining and Machine Learning 8.3 The NETWORK Procedure, Copyright 2018, SAS Institute Inc., Chapter 2.

SAS Viya Programming Documentation, The patternMatch action in the Network Action Set, last updated Nov. 4, 2020.

* cited by examiner

RANGE OVERLAP QUERY RESPONSE SYSTEM FOR GRAPH DATA

CROSS-REFERENCE TO RELATED APPLICATIONS

The present application claims the benefit of 35 U.S.C. § 119(e) to U.S. Provisional Patent Application No. 63/088,439 filed on Oct. 6, 2020 and to U.S. Provisional Patent Application No. 63/058,429 filed on Jul. 29, 2020, the entire contents of which are hereby incorporated by reference.

BACKGROUND

A need to identify range overlaps in a graph that includes connected nodes arises in fraud and crime investigation, contact tracing, scheduling, social networks, data management, mobile networking etc. For illustration, a range can indicate a temporal or spatial range as well as any other continuous space where constraints are enforced. The graph may include millions of links between thousands of nodes. As a result, efficient processing of the query to detect range overlaps is needed.

SUMMARY

In an example embodiment, a non-transitory computer-readable medium is provided having stored thereon computer-readable instructions that, when executed by a computing device, cause the computing device to determine a response to a query. Start node values are read from a dataset to define a plurality of start nodes, and end node values are read from the dataset to define a plurality of end nodes. A plurality of link attributes associated with each connection between a start node and an end node is defined based on a predefined link start variable and a predefined link stop variable read from the dataset. A bin start value and a bin stop value is defined for each bin of a predefined plurality of bins. Defining the bin start value and the bin stop value is based on an input bin option. The plurality of end nodes are split based on the defined bin start value and the defined bin stop value of each bin of the predefined plurality of bins to define a second plurality of end nodes. Each start node of the plurality of start nodes that is connected to each end node of the second plurality of end nodes is identified based on the respective link attributes of the defined plurality of link attributes. Overlapping start nodes of the plurality of start nodes that overlap at an end node of the second plurality of end nodes are identified based on a predefined overlap query graph. The predefined overlap query graph defines a connectivity to identify between a start node and the end node. The identified overlapping start nodes are output as a response to the predefined overlap query graph.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine a response to a query.

In yet another example embodiment, a method of determining a response to a query is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A graph may include a plurality of classes of nodes. Nodes may be connected to an arbitrary number of other nodes by links. Each link has a range start and a range end attribute that define a range. For example, in a contact tracing use case, one class of nodes could represent people while a second class of nodes represent locations. The range start and range end attributes of each link could represent the arrival and departure time of a person's visit to the linked location. In this use case, the range overlap detection problem consists of finding all instances of two or more persons linked to the same location for some overlapping time range.

The graph may include millions of links between thousands of start nodes and end nodes. An overlap detection application 122 described herein provides significantly faster determinations of range overlap by start nodes using a similar amount of peak computer memory or even substantially less peak computer memory than existing methods. Overlap detection arises in many application areas such as contact tracing, disease pathway determination, fraud and crime investigation, scheduling, data management, mobile networking, etc. The overlap detection process may be based on a range overlap query definition that defines characteristics of the range overlap to detect in the graph. For example, a simple contact tracing query may involve a pair of people nodes that overlap at a location node based on a comparison between a start time and an end time of link attributes that connect at the location node though other more complex queries can be used in the overlap detection process.

Figure 1:
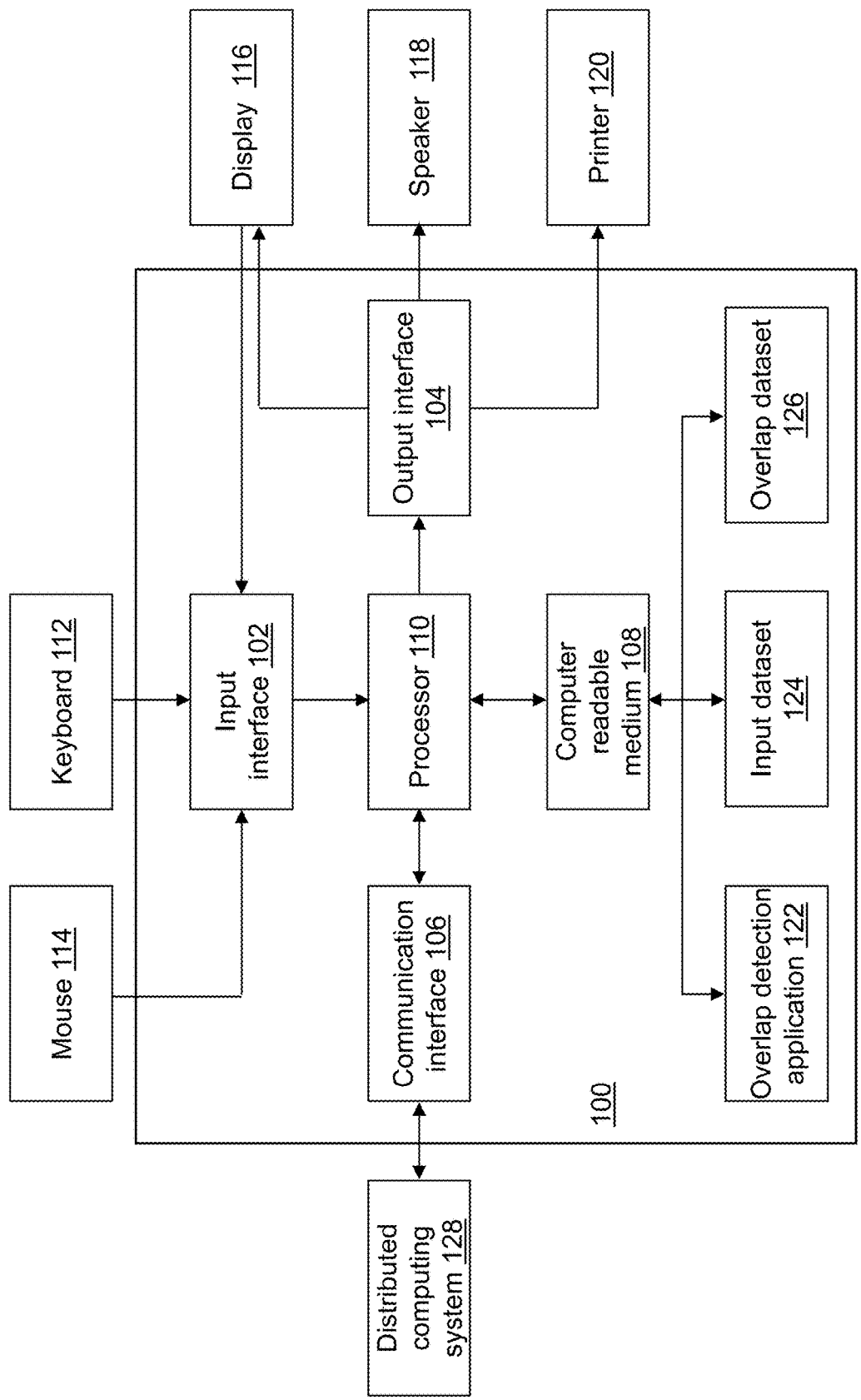
FIG. 1 depicts a block diagram of a graph overlap detection device in accordance with an illustrative embodiment.

Referring to FIG. 1, a block diagram of an overlap detection device 100 is shown in accordance with an illustrative embodiment. Overlap detection device 100 may include an input interface 102, an output interface 104, a communication interface 106, a non-transitory computer-readable medium 108, a processor 110, overlap detection application 122, an input dataset 124, and an overlap dataset 126. Fewer, different, and/or additional components may be incorporated into overlap detection device 100.

Input interface 102 provides an interface for receiving information from the user or another device for entry into overlap detection device 100 as understood by those skilled in the art. Input interface 102 may interface with various input technologies including, but not limited to, a keyboard 112, a mouse 114, a display 116, a track ball, a keypad, one or more buttons, etc. to allow the user to enter information into overlap detection device 100 or to make selections presented in a user interface displayed on display 116. The same interface may support both input interface 102 and output interface 104. For example, display 116 comprising a touch screen provides a mechanism for user input and for presentation of output to the user. Overlap detection device 100 may have one or more input interfaces that use the same or a different input interface technology. The input interface technology further may be accessible by overlap detection device 100 through communication interface 106.

Output interface 104 provides an interface for outputting information for review by a user of overlap detection device 100 and/or for use by another application or device. For example, output interface 104 may interface with various output technologies including, but not limited to, display 116, a speaker 118, a printer 120, etc. Overlap detection device 100 may have one or more output interfaces that use the same or a different output interface technology. The output interface technology further may be accessible by overlap detection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Overlap detection device 100 may have one or more communication interfaces that use the same or a different communication interface technology. For example, overlap detection device 100 may support communication using an Ethernet port, a Bluetooth antenna, a telephone jack, a USB port, etc. Data and messages may be transferred between overlap detection device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Overlap detection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Overlap detection device 100 also may have one or more drives that support the loading of a memory media such as a CD, DVD, an external hard drive, etc. One or more external hard drives further may be connected to overlap detection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Overlap detection device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Overlap detection application 122 performs operations associated with identifying an overlap between coterminal links in a graph based on link start values and link stop values. For example, a pair of start nodes that overlap at an end node based on respective link start values and link stop values may be output to overlap input dataset 124 in contact tracing. Data describing the pair of start nodes may be output to support various data analysis functions as well as provide alert/messaging related to the overlap detection. Some or all of the operations described herein may be embodied in overlap detection application 122. The operations may be implemented using hardware, firmware, software, or any combination of these methods.

Referring to the example embodiment of FIG. 1, overlap detection application 122 is implemented in software (comprised of computer-readable and/or computer-executable instructions) stored in computer-readable medium 108 and accessible by processor 110 for execution of the instructions that embody the operations of overlap detection application 122. Overlap detection application 122 may be written using one or more programming languages, assembly languages, scripting languages, etc. Overlap detection application 122 may be integrated with other analytic tools. As an example, overlap detection application 122 may be part of an integrated data analytics software application and/or software architecture such as that offered by SAS Institute Inc. of Cary, N.C., USA. For example, overlap detection application 122 may be implemented using or integrated with one or more SAS software tools such as SAS® Enterprise Miner™, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, SAS® Forecast Server, SAS® Event Stream Processing, all of which are developed and provided by SAS Institute Inc. of Cary, N.C., USA. Data mining is applicable in a wide variety of industries. For illustration, overlap detection application 122 may be implemented as part of a procedure such as the NETWORK procedure implemented as part of SAS® Visual Data Mining and Machine Learning.

Overlap detection application 122 may be integrated with other system processing tools to automatically process data received through input interface 102 and/or communication interface 106 generated as part of operation of an enterprise, device, system, facility, etc. to monitor the data that may be output using output interface 104 and/or communication interface 106 so that appropriate action can be initiated in response to changes in the monitored data.

Overlap detection application 122 may be implemented as a Web application. For example, overlap detection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. Input dataset 124 may be transposed. The plurality of variables may define multiple dimensions for each observation vector. An observation vector $x_i$ may include a value for each of the plurality of variables associated with the observation i. All or a subset of the columns may be used as variables that define observation vector $x_i$. Each variable of the plurality of variables may describe a characteristic of a physical object. Alternatively, input dataset 124 may include a graph database that is non-tabular, but also used to define a plurality of observation vectors.

The data stored in input dataset 124 may be generated by and/or captured from a variety of sources including one or more sensors of the same or different type, one or more computing devices, etc. The data stored in input dataset 124 may be received directly or indirectly from the source and may or may not be pre-processed in some manner. For example, the data may be pre-processed using an event stream processor such as SAS® Event Stream Processing. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Input dataset 124 may be stored on computer-readable medium 108 or on one or more computer-readable media of distributed computing system 128 and accessed by overlap detection device 100 using communication interface 106, input interface 102, and/or output interface 104. Data stored in input dataset 124 may be continually received for processing by overlap detection application 122. The data stored in input dataset 124 may include any type of content represented in any computer-readable format such as binary, alphanumeric, numeric, string, markup language, etc. The content may include sensor data, textual information, graphical information, image information, audio information, numeric information, etc. that further may be encoded using various encoding techniques as understood by a person of skill in the art. The data stored in input dataset 124 may be captured at different time points periodically, intermittently, when an event occurs, continuously, etc. One or more columns of input dataset 124 may include a time and/or date value.

Input dataset 124 may include data captured at a high data rate such as 200 or more observations per second for one or more physical objects. For example, data stored in input dataset 124 may be generated as part of the IoT, where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Some data may be processed with an event stream processing engine (ESPE), which may reside in the cloud or in an edge device before being stored in input dataset 124.

Input dataset 124 may be stored using various data structures as known to those skilled in the art including one or more files of a file system, a relational database, one or more tables of a system of tables, a structured query language database, etc. on overlap detection device 100 or on distributed computing system 128. Overlap detection device 100 may coordinate access to input dataset 124 that is distributed across distributed computing system 128 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS® Viya™ open, cloud-ready, in-memory architecture also may be used as an analytic platform to enable multiple users to concurrently access data stored in input dataset 124. Some systems may use SAS In-Memory Statistics for Hadoop® to read big data once and analyze it several times by persisting it in-memory for the entire session. Some systems may be of other types and configurations.

Referring to FIGS. 2A and 2B and FIGS. 3 to 6, example operations associated with overlap detection application 122 are described. Additional, fewer, or different operations may be performed depending on the embodiment of overlap detection application 122. The order of presentation of the operations of FIGS. 2A and 2B and FIGS. 3 to 6 is not intended to be limiting. Although some of the operational flows are presented in sequence, the various operations may be performed in various repetitions, concurrently (in parallel, for example, using threads and/or distributed computing system 128), and/or in other orders than those that are illustrated. For example, a user may execute overlap detection application 122, which causes presentation of a first user interface window, which may include a plurality of menus and selectors such as drop-down menus, buttons, text boxes, hyperlinks, etc. associated with overlap detection application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by overlap detection application 122.

In an operation 200, a first indicator may be received that indicates input dataset 124. For example, the first indicator indicates a location and a name of input dataset 124. As an example, the first indicator may be received by overlap detection application 122 after selection from a user interface window or after entry by a user into a user interface window. In an alternative embodiment, input dataset 124 may not be selectable. For example, a most recently created dataset may be used automatically.

In an operation 202, a second indicator may indicate a start node variable of input dataset 124 to define a start node value. For example, the second indicator may indicate a column number or a column name. As an example, the second indicator may be received by overlap detection application 122 after selection from a user interface window or after entry by a user into a user interface window. In an alternative embodiment, the start node variable may not be selectable. For example, a first column of input dataset 124 may be used automatically. For illustration, the start node value may define an indicator of a start node such as a person, an entity, such a business, a park, or an address, a mobile device, a vehicle, etc.

In an operation 204, a third indicator may indicate an end node variable of input dataset 124 to define an end node value. For example, the third indicator may indicate a column number or a column name. As an example, the third indicator may be received by overlap detection application 122 after selection from a user interface window or after entry by a user into a user interface window. In an alternative embodiment, the end node variable may not be selectable. For example, a second column of input dataset 124 may be used automatically. For illustration, the end node value may define an indicator of an end node such as a person, an entity, a geographic location, a cell tower, a computer, an academic course, an invoice, etc.

In an operation 206, a fourth indicator may indicate a link start variable and a link stop variable of input dataset 124 to define a link start value and a link stop value, respectively. For example, the fourth indicator may indicate a column number or a column name for the link start variable and the link stop variable. As an example, the fourth indicator may be received by overlap detection application 122 after selection from a user interface window or after entry by a user into a user interface window. In an alternative embodiment, the link start variable and the link stop variable may not be selectable. For example, a third column and a fourth column, respectively, of input dataset 124 may be used automatically. For illustration, the link start value and the link stop value may be a time value, a spatial dimension, an IP address, a competitive rank, etc.

In an operation 208, a fifth indicator may indicate a match link start value and a match link stop value. For example, the match link start value and the match link stop value may be a start time value and a stop time value for determining overlaps in input dataset 124. As an example, the fifth indicator may be received by overlap detection application 122 after selection from a user interface window or after entry by a user into a user interface window. In an alternative embodiment, the match link start value and the match link stop value may not be selectable. For example, a minimum value may be read from values of the link start variable to define the match link start value, and a maximum value may be read from values of the link stop variable to define the match link stop value.

In an operation 210, a sixth indicator may indicate a bin option value. For example, the bin option value may be used to indicate if bins are used to split end nodes of the end node variable. The bin option value further may be used to indicate how the bins are defined if used to split end nodes of the end node variable. As an example, the sixth indicator may be received by overlap detection application 122 after selection from a user interface window or after entry by a user into a user interface window. In an alternative embodiment, the sixth indicator may not be received. For example, a default value may be stored, for example, in computer-readable medium 108 and used automatically. For illustration, a bin option value of zero may indicate that bins are not used to split end nodes of the end node variable; a bin option value of one may indicate that bins defined based on fixed widths are used to split end nodes of the end node variable; a bin option value of two may indicate that bins defined based on a determined bin width are used to split end nodes of the end node variable; and a bin option value of three may indicate that bins defined based on a quantile distribution are used to split end nodes of the end node variable.

In an operation 211, a graph is defined based on the start node variable indicated in operation 202 as "from" nodes, the end node variable indicated in operation 204 as "to" nodes, and the link start variable and the link stop variable indicated in operation 206 as link or edge attributes of the graph. The nodes are vertices of the graph, and the links or edges connect start nodes to end nodes with the associated attributes.

In an operation 212, a determination is made concerning whether bins are used to split end nodes of the graph based on the bin option value. When bins are used to split end nodes, processing continues in an operation 214. When bins are not used to split end nodes, processing continues in an operation 258 shown referring to FIG. 2B. For example, a bin option value greater than zero may indicate that bins are used to split end nodes of the end node variable.

In operation 214, a determination is made concerning whether fixed widths are used to split end nodes of the graph based on the bin option value. When fixed widths are used, processing continues in an operation 216. When fixed widths are not used, processing continues in an operation 220. For example, a bin option value equal to one may indicate that fixed widths are used to split end nodes of the end node variable.

In operation 216, a seventh indicator of a number of bins or a bin width may be received. In an alternative embodiment, the number of number of bins or the bin width may not be received. For example, a default value for the number of bins or the bin width may be stored, for example, in computer-readable medium 108 and used automatically. In another alternative embodiment, the value of the number of bins or the bin width may not be selectable. Instead, a fixed, predefined value may be used, for example, for the number of bins.

In an operation 217, bin start values and bin stop values are defined using the number of bins or the bin width indicated in operation 216. For illustration, referring to FIG. 3, example operations associated with defining bin start values and bin stop values are shown.

In an operation 300, a bin width is determined if the bin width $b_w$ is not defined or a number of bins is determined if the number of bins $N_b$ is not defined. For example, when the bin width is defined, but the number of bins is not defined, the number of bins is determined using $N_b$=ceil((start−stop)/$b_w$), where start is the match link start value, and stop is the match link stop value. For example, when the number of bins is defined, but the bin width is not defined, the bin width is determined using $b_w$=(start−stop)/$N_b$.

In an operation 302, a bin counter i is initialized, for example, using i=1; a first bin start value $start_1$ is initialized, for example, using $start_1$=start; and a first bin stop value $stop_1$ is initialized, for example, using $stop_1$=$start_1$+$b_w$.

In an operation 304, a determination is made concerning whether there is another bin to define. When there is another bin to define, processing continues in an operation 306.

When there is not another bin to define, processing continues in an operation 312. For example, when i≤$N_b$, there is another bin to define.

In operation 306, the bin counter i is incremented, for example, using i=i+1.

In an operation 308, a bin start value for a next bin defined by the bin counter i is determined, for example, using $start_i$=$stop_{i-1}$.

In an operation 310, a bin stop value for the next bin defined by the bin counter i is determined, for example, using $stop_i$=$start_i$+$b_w$, and processing continues in operation 304.

In operation 312, defining the bins is done.

Figure 2A:
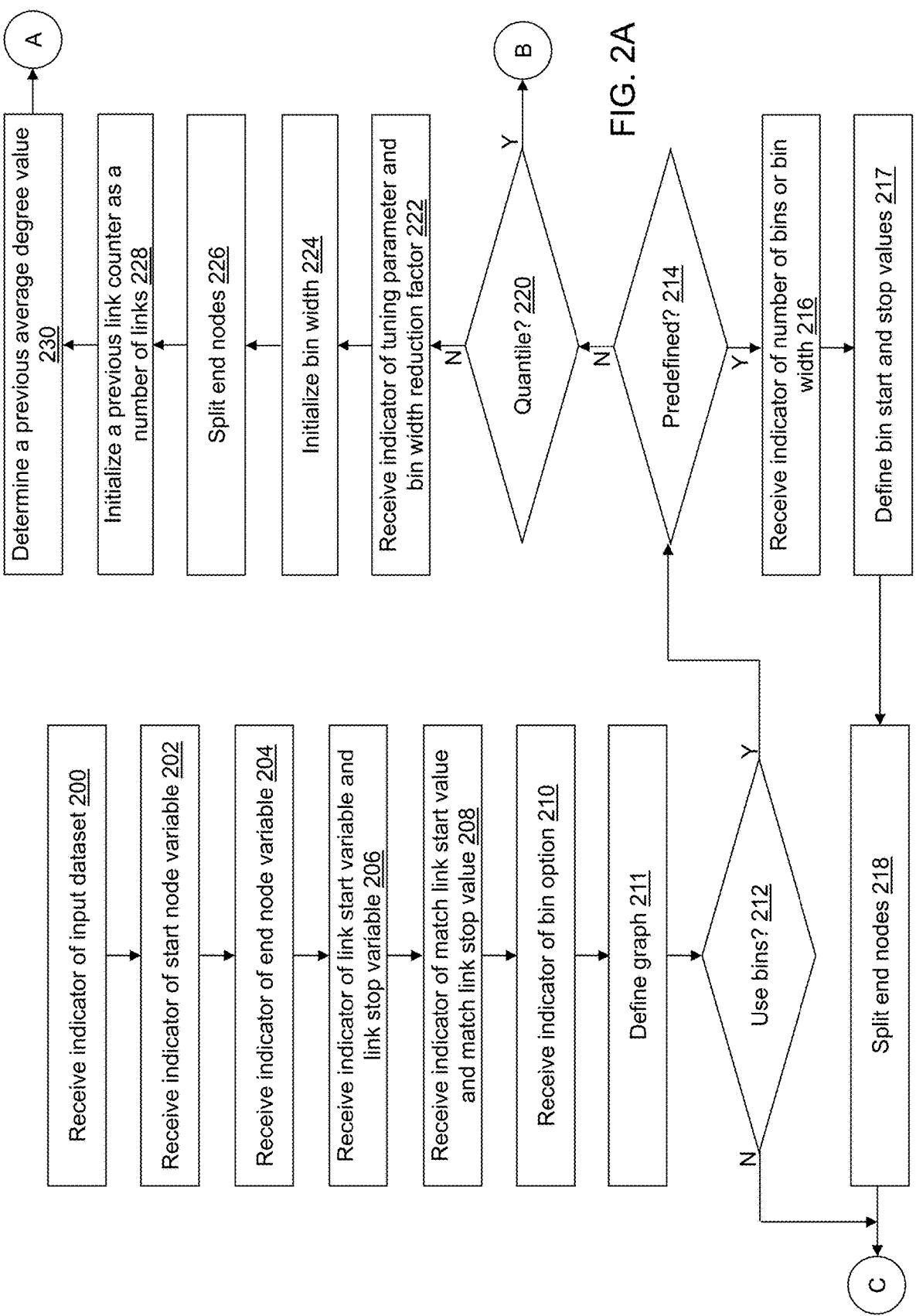
FIGS. 2A and 2B depict a flow diagram illustrating examples of operations performed by the graph overlap detection device of FIG. 1 in accordance with an illustrative embodiment.
Figure 2B:
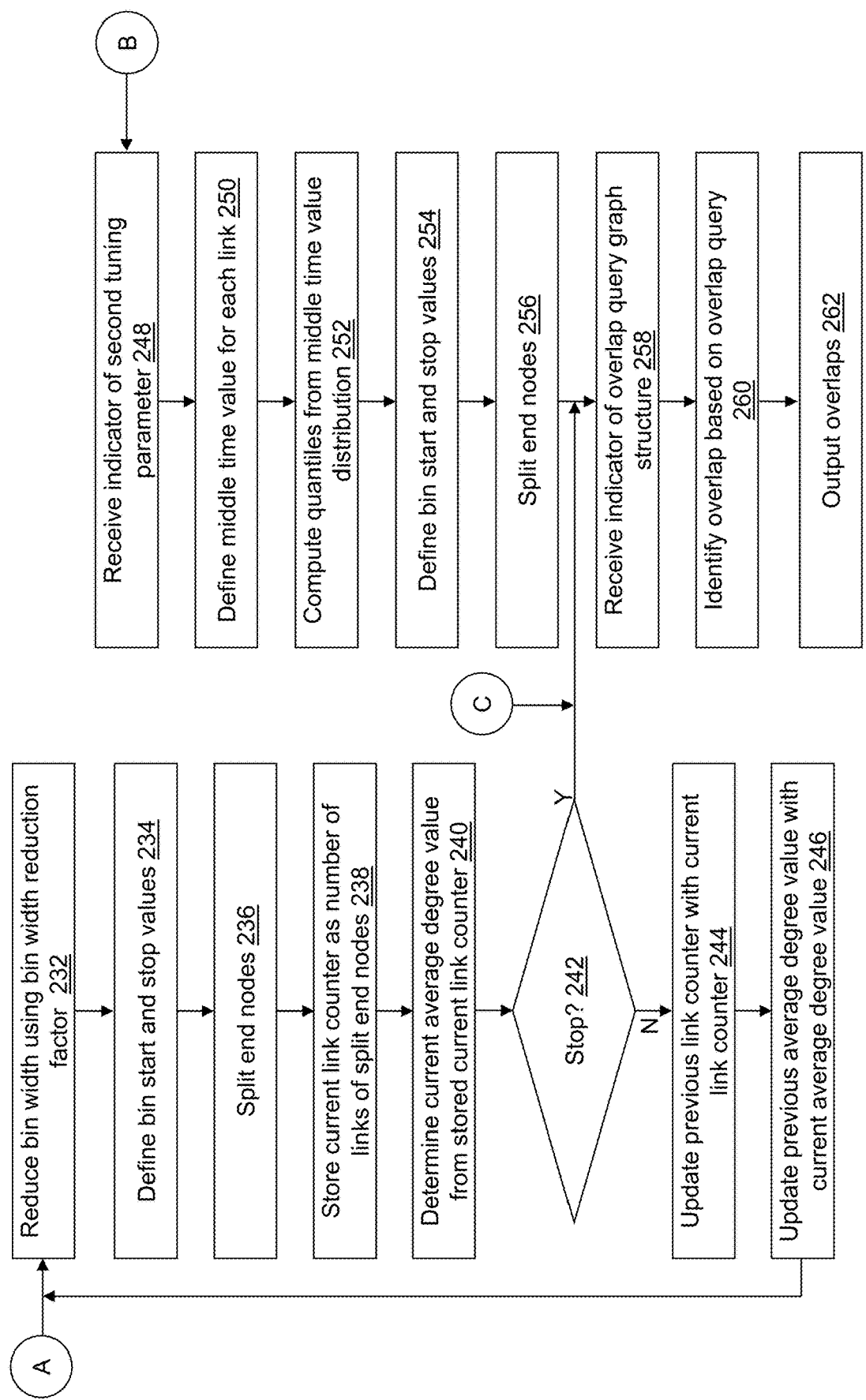
Figure 3:
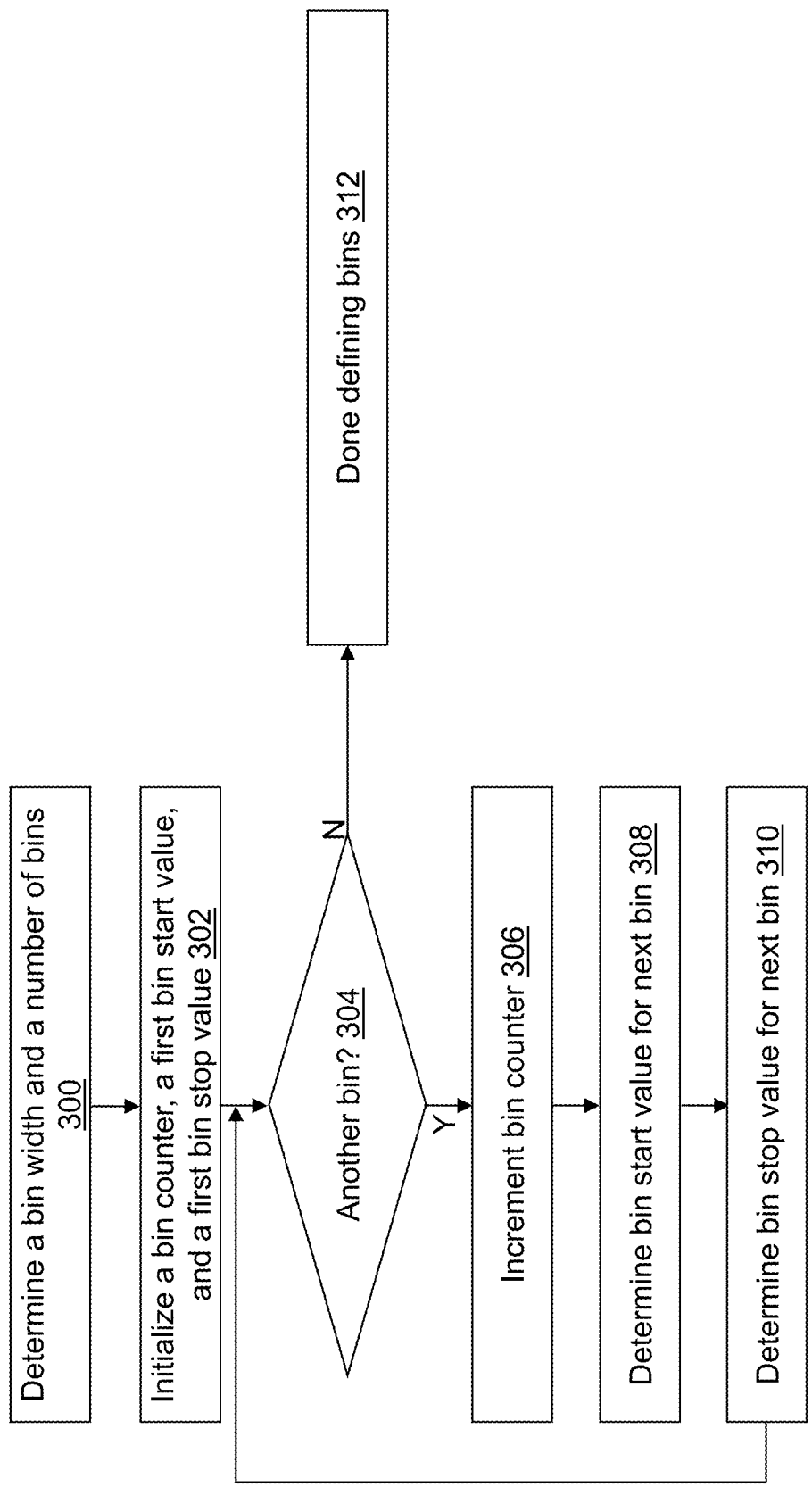
FIG. 3 depicts a flow diagram illustrating examples of bin defining operations performed by the graph overlap detection device of FIG. 1 in accordance with an illustrative embodiment.
Figure 4:
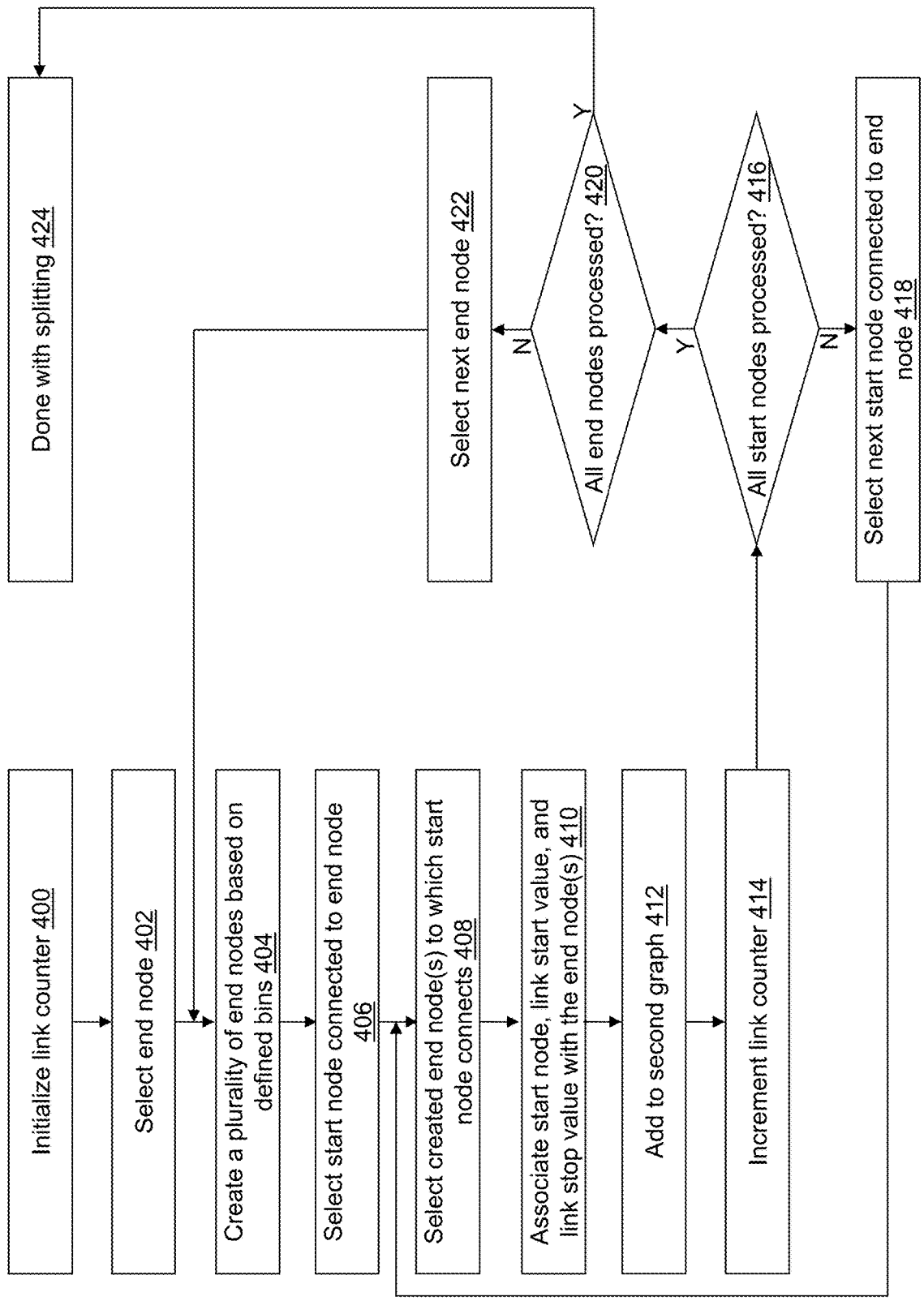
FIG. 4 depicts a flow diagram illustrating examples of splitting operations performed by the graph overlap detection device of FIG. 1 in accordance with an illustrative embodiment.

Referring again to FIG. 2A, in an operation 218, the end nodes of the graph are split using the bin start values and bin stop values defined in operation 217, and processing continues in an operation 258 shown referring to FIG. 2B. For example, referring to FIG. 4, example operations associated with splitting the end nodes of the graph are shown.

In an operation 400, a link counter L is initialized, for example, using L=0.

In an operation 402, an end node is selected from the end nodes of the graph for which splitting is requested.

In an operation 404, a plurality of end nodes is created from the selected end node based on the plurality of bins. For example, when $N_b$=10, the created plurality of end nodes includes 10 nodes, one for each bin. For illustration, the created plurality of end nodes may include $n_s$_$start_i$_$stop_i$, i=1, . . . , $N_b$, where $n_s$ is the end node variable value of the selected end node that is appended with the bin start value of the $i^{th}$ bin and/or with the bin stop value of the $i^{th}$ bin to define an end node that is identifiable as a combination of the selected end node and a respective bin of the plurality of bins.

In an operation 406, a start node is selected that is connected to the selected end node in the graph for which splitting is requested. For example, referring to FIG. 6, a portion of a first graph is shown in accordance with an illustrative embodiment. A first start node 600a has a start node variable value of "Dennis". A second start node 600b has a start node variable value of "Alice". A third start node 600c has a start node variable value of "Bob". A first end node 602a has an end node variable value of "Tavern". Each of first start node 600a, second start node 600b, and third start node 600c connect to first end node 602a with a plurality of links 604. A start time and a stop time are attributes associated with each link of the graph. For example, a first link 606 indicates that "Dennis" was at the "Tavern" on May 3 between 1900 and 2100 hours based on the connection of first start node 600a to first end node 602a. A start node selected in the graph may be first start node 600a.

Referring again to FIG. 4, in an operation 408, the link attributes of the selected start node are compared to the created plurality of end nodes $n_s$_$start_i$_$stop_i$, i=1, . . . , $N_b$ to select to which created end node(s) the selected start node is connected in a new graph based on the link start variable value and the link stop variable value associated with the selected start node. For example, the link start variable value of 1900 on May 3 and the link stop variable value of 2100 on May 3 are compared to the $start_i$_$stop_i$ of each created end node to see if there is a connection or not for that combination of end node and binned link attribute value. There may be one or more connections from the selected start node to the created plurality of end nodes because the link start variable value and the link stop variable value of the selected start node may span more than one of the created plurality of end nodes.

In an operation 410, the selected start node, the link start variable value, and the link stop variable value of the connection between the selected start node and the selected end node are associated with each end node of the created end node(s) identified in operation 408.

Figure 7A:
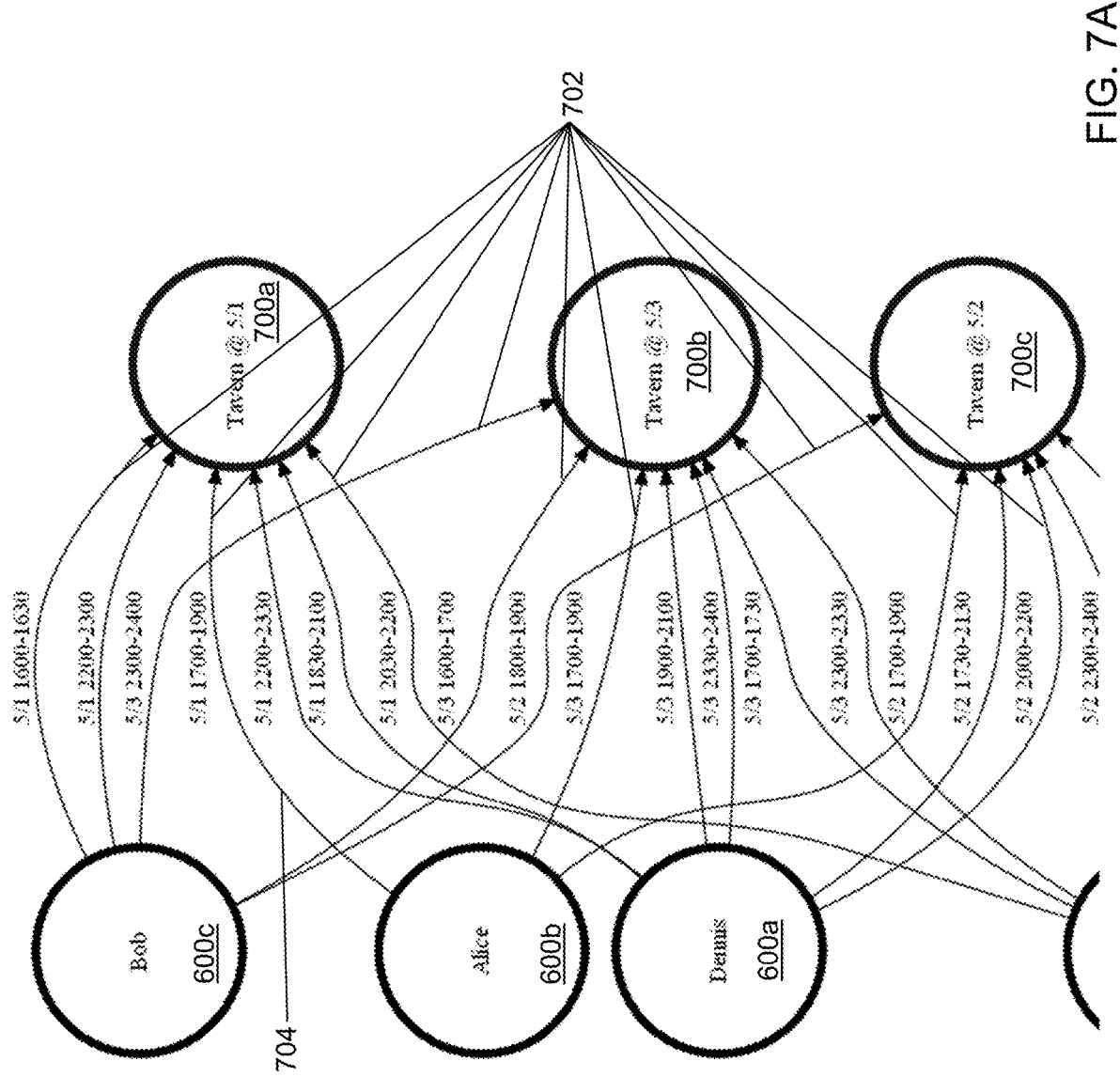
FIG. 7A depicts a portion of a second graph after splitting the portion of the first graph in accordance with an illustrative embodiment.

For example, referring to FIG. 7A, a portion of a split first graph is shown in accordance with an illustrative embodiment. First end node 602a has been split into three different end nodes, a first created end node 700a, a second created end node 700b, and a third created end node 700c, where each end node is associated with a day based on the bins having a bin width of one day and the link attributes representing the time for a particular link that overlaps with the bin width time window. For example, first created end node 700a is for the "Tavern" end node on May 1; second created end node 700b is for the "Tavern" end node on May 3; and third created end node 700c is for the "Tavern" end node on May 2. A second plurality of links 702 connect first start node 600a, second start node 600b, and third start node 600c to first created end node 700a, second created end node 700b, and third created end node 700c.

Figure 7B:
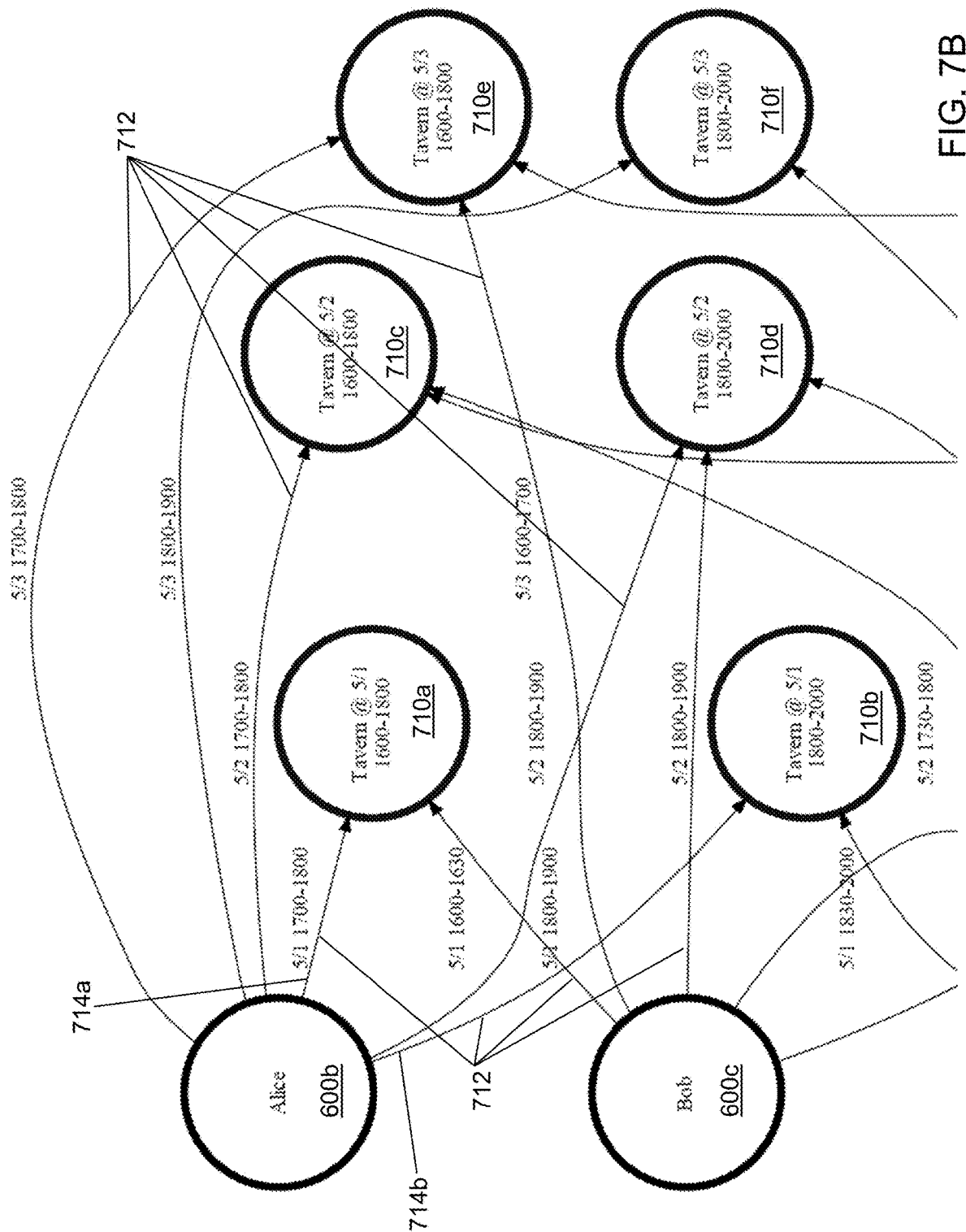
FIG. 7B depicts a portion of a third graph after splitting a second portion of the first graph in accordance with an illustrative embodiment.

Of course, the bin width could have been a greater or a lesser value such as two hours a portion of which is shown referring to FIG. 7B. First end node 602a has been split or split into numerous end nodes only some of which are shown for simplicity. Six different end nodes include a first created end node 710a, a second created end node 710b, a third created end node 710c, a fourth created end node 710d, a fifth created end node 710e, and a sixth created end node 710f, where each end node is associated with a two-hour time window of each day based on the bins having a bin width of two-hours and the link attributes representing the time for a particular link that overlaps with the bin width time window. For example, first created end node 710a is for the "Tavern" end node on May 1 between 1600 and 1800 hours; second created end node 710b is for the "Tavern" end node on May 1 between 1800 and 2000 hours; third created end node 710c is for the "Tavern" end node on May 2 between 1600 and 1800 hours, fourth created end node 710d is for the "Tavern" end node on May 2 between 1800 and 2000 hours; fifth created end node 710e is for the "Tavern" end node on May 3 between 1600 and 1800 hours, and sixth created end node 710f is for the "Tavern" end node on May 3 between 1800 and 2000 hours. A third plurality of links 712 connect second start node 600b and third start node 600c to first created end node 710a, second created end node 710b, third created end node 710c, fourth created end node 710d, fifth created end node 710e, and sixth created end node 710f.

The link start variable value and the link stop variable value of the connection between the selected start node and the end node of the created end node(s) identified in operation 408 may be adjusted to the portion of the link start variable value and the link stop variable value that is overlaps based on a respective end node. For example, referring to FIG. 7A, a link 704 between second start node 600b and first created end node 700a includes a link start value of May 1 at 1700 and a link stop value of May 1 at 1900; whereas, referring to FIG. 7B, a first link 714a between second start node 600b and first created end node 710a includes a link start value of May 1 at 1700 and a link stop value of May 1 at 1800, and a second link 714b between second start node 600b and second created end node 710b includes a link start value of May 1 at 1800 and a link stop value of May 1 at 1900. As a result, the link attribute values may be adjusted to include only the portion that overlaps based on the created end node definition.

In an operation 412, the selected start node connected to each created end node(s) selected in operation 408 are added to the new graph with the link start variable value and the link stop variable value as link attributes. For example, if the selected start node connects to three of the created end nodes, a link is created from the selected start node to each of the three created end nodes(s). Again, the link attribute values may be adjusted based on the created end node definition.

In an operation 414, the link counter L is updated, for example, using $L=L+N_L$, where $N_L$ is the number of links created and added to the new graph in operation 412.

In an operation 416, a determination is made concerning whether each start node connected to the selected node has been processed. When each start node connected to the selected node has been processed, processing continues in an operation 420. When each start node connected to the selected node has not been processed, processing continues in an operation 418. For example, referring to the first graph of FIG. 6, each start node connected to the selected node has been processed when first start node 600a, second start node 600b, and third start node 600c have all been selected and processed.

Referring again to FIG. 4, in operation 418, a next start node of the start nodes connected to the selected end node is selected, and processing continues in operation 408. For example, second start node 600b may be selected as the next start node, and third start node 600c may be selected on a next iteration of operation 418 as the next start node.

In operation 420, a determination is made concerning whether each end node of the graph has been selected and processed. When each end node has been processed, processing continues in an operation 424. When each end node has not been processed, processing continues in an operation 422.

In operation 422, a next end node of the end nodes of the graph is selected, and processing continues in operation 404.

In operation 424, splitting the end nodes of the graph is done, and the new graph that is split is complete.

Deriving a number of link overlap comparisons needed to perform the overlap query, for each end node, it is necessary to check every pair of links that originate from different start nodes. The number of comparisons c required is $c=\Sigma_k \Sigma_j \Sigma_{i<j} L_{ik} L_{jk}$, where $L_{ik}$ is a number of links connecting start node i to end node k. With a smaller bin width value, there are fewer links to each end node, which reduces the number of comparisons needed to determine overlap.

Referring again to FIG. 2A, in operation 220, a determination is made concerning whether the quantile distribution is used to split end nodes of the graph based on the bin option value. When the quantile distribution is used, processing continues in an operation 248 shown referring to FIG. 2B. When the quantile distribution is not used, processing continues in an operation 222. For example, a bin option value equal to three may indicate that the quantile distribution is used to split end nodes of the end node variable.

In operation 222, an eighth indicator of a tuning parameter and a bin width reduction factor may be received. In an alternative embodiment, the tuning parameter and the bin width reduction factor may not be received. For example, default values for the tuning parameter and the bin width reduction factor may be stored, for example, in computer-readable medium 108 and used automatically. In another alternative embodiment, the value of the tuning parameter and the bin width reduction factor may not be selectable. Instead, fixed, predefined values may be used. For example, a default value for the tuning parameter may be ten. For example, a default value for the bin width reduction factor may be 0.5.

In an operation 224, a bin width value $b_w$ is initialized to the match link stop value minus the match link start value.

In an operation 226, the end nodes of the graph are split using the bin width. Again, referring to FIG. 4, example operations associated with splitting the end nodes are shown.

In an operation 228, a previous link counter $L_p$ is initialized to a number of links included in the split graph $L_p=L_o$. In operation 226, there is a single bin so the split graph includes the same number of links as the graph defined in operation 211.

In an operation 230, a previous average degree value is computed using the previous link counter $L_p$, and processing continues in an operation 232 shown referring to FIG. 2B. For example, the previous average degree value $D_p$ is the previous link counter $L_p$ divided by a number of start nodes and a number of end nodes $N_n$ included in the graph, $D_p=L_p/N_n$.

Referring to FIG. 2B, in operation 232, the bin width $b_w$ is reduced using the bin width reduction factor. For example, $b_w=b_w*b_{rf}$, where $b_{rf}$ is the bin width reduction factor indicated in operation 222.

In an operation 234, bin start values and bin stop values are defined using the bin width reduced in operation 232. Again, referring to FIG. 3, example operations associated with defining bin start values and bin stop values are shown.

In an operation 236, the end nodes of the graph are split using the bin start values and bin stop values defined in operation 234. Again, referring to FIG. 4, example operations associated with splitting the end nodes of the graph are shown.

In an operation 238, a current link counter $L_c$ is stored as a number of links included in the graph split in operation 236.

In an operation 240, a current average degree value $D_c$ is computed using the current link counter $L_c$. For example, the current average degree value $D_c$ is the current link counter $L_c$ divided by a number of start nodes and a number of end nodes $N_n$ included in the graph split in operation 236, $D_c=L_c/N_n$.

In an operation 242, a determination is made concerning whether an optimum bin width has been determined. When the optimum bin width has been determined, processing continues in an operation 258. When the optimum bin width has not been determined, processing continues in an operation 244. For example, the optimum bin width may be determined when $(D_p-D_c)/D_p<\rho(L_c-L_p)/L_p$, where $\rho$ is the tuning parameter indicated in operation 222.

In operation 244, the previous link counter $L_p$ is updated with the current link counter $L_c$, for example, using $L_p=L_c$.

In an operation 246, the previous average degree value $D_p$ is updated with the current average degree value $D_c$, for example, using $D_p=D_c$, and processing continues in operation 232 to further reduce the bin width.

In operation 248, a ninth indicator of a number of bins $N_b$ or a number of quantiles $N_q$ may be received. In an alternative embodiment, the number of bins $N_b$ or the number of quantiles $N_q$ may not be received. For example, a default value for the number of bins $N_b$ or the number of quantiles $N_q$ may be stored, for example, in computer-readable medium 108 and used automatically. In another alternative embodiment, the value of the number of bins $N_b$ or the number of quantiles $N_q$ may not be selectable. Instead, a fixed, predefined value may be used, for example, for the number of quantiles $N_q$. For example, a default value for the number of quantiles $N_q$ may be $N_q=200$. When the number of bins $N_b$ is defined, the number of quantiles $N_q$ may be defined as $N_q=N_b-1$.

In an operation 250 a middle time value is determined for each link of the graph defined in operation 211, and stored, for example, in a middle time array M. For example, $$M[i] = \frac{l_{start,i} + l_{stop,i}}{2},$$

$i=1, \ldots, L_o$, where $l_{start,i}$ is an $i^{th}$ link start variable value, $l_{stop,i}$ is an $i^{th}$ link stop variable value, and $L_o$ is a number of links included in the graph defined in operation 211.

In an operation 252, the number of quantiles $N_q$ are computed from a distribution of the middle time values stored in middle time array M, and stored, for example, in a quantile array Q.

In an operation 254, bin start and stop values are determined from the $N_q$ quantile values. Bin one is defined with the match link start value as the bin start value and $Q_1$ as the bin stop value. Bin two is defined with $Q_1$ as the bin start value and $Q_2$ as the bin stop value. Bin three is defined with $Q_2$ as the bin start value and $Q_3$ as the bin stop value . . . . A last bin is defined with $Q_{N_q}$ as the bin start value and the match link stop value as the bin stop value.

In an operation 256, the end nodes of the graph are split using the bin start values and bin stop values defined in operation 254. Again, referring to FIG. 4, example operations associated with splitting the end nodes of the graph are shown.

In an operation 258, a tenth indicator may indicate an overlap query graph structure. For example, the overlap query graph structure defines a graph structure for which matches (overlap) in the graph are to be identified. As an example, the tenth indicator may be received by overlap detection application 122 after selection from a user interface window or after entry by a user into a user interface window. In an alternative embodiment, the overlap query graph structure may not be selectable. For example, the overlap query graph structure by default or without allowing a user selection. For illustration, a default overlap query graph structure may be the contact tracing query that includes two start nodes that are connected to and overlap at an end node.

In operation 260, overlap, as defined by the overlap query graph structure, in the graph are identified. The graph may be the graph defined in operation 211 if bins were not used. The graph may be the graph defined in operation 218 if fixed widths were used to define the bins to split the graph defined in operation 211. The graph may be the graph defined in operation 256 if quantiles were used to define the bins to split the graph defined in operation 211. Otherwise, the graph may be the graph defined in operation 236 based on determining an optimum bin width. For illustration, a PatternMatch statement of a Network procedure of SAS® Visual Data Mining and Machine Learning may be used to identify the overlap in the provided graph based on the overlap query graph structure.

Figure 5:
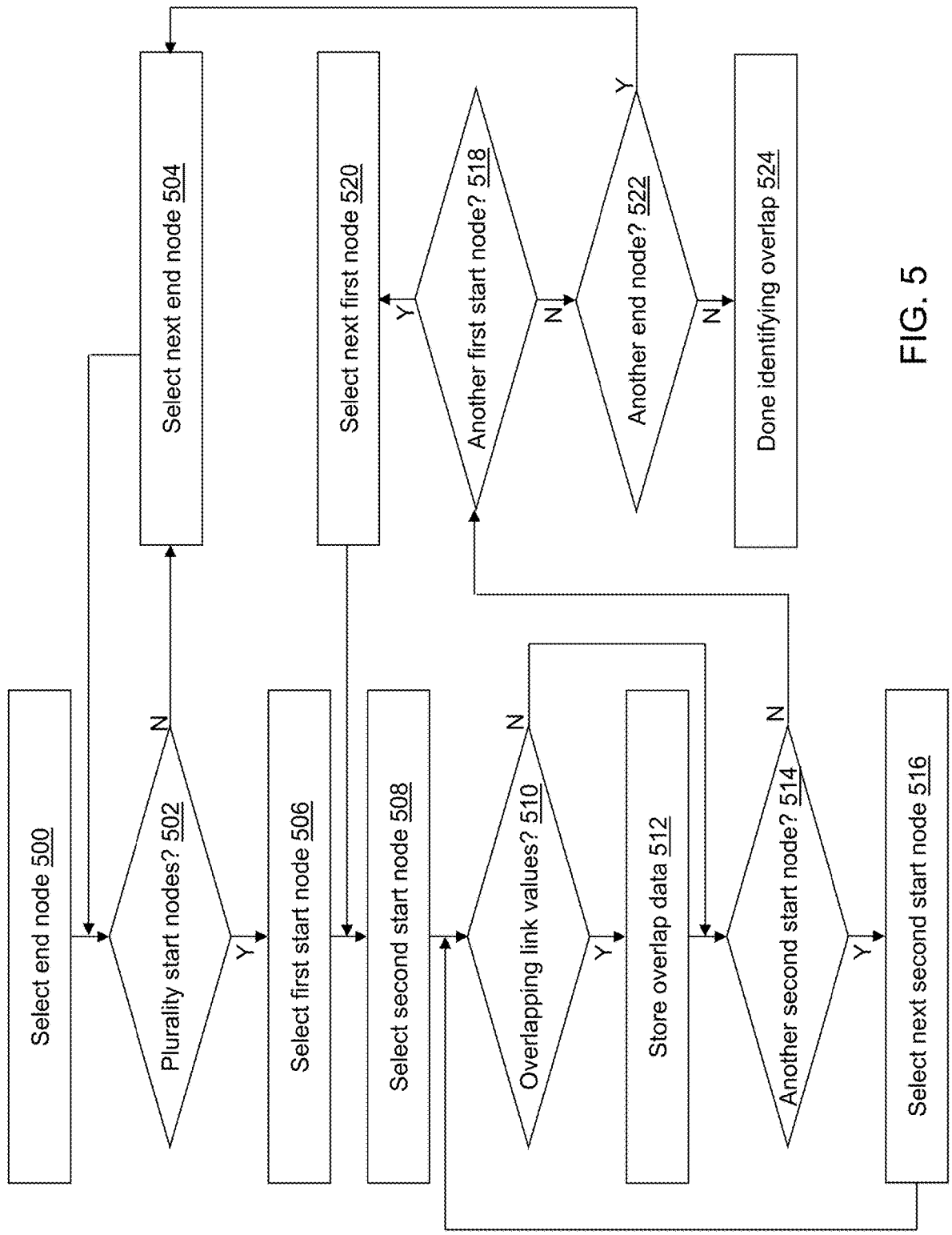
FIG. 5 depicts a flow diagram illustrating examples of overlap detection operations performed by the graph overlap detection device of FIG. 1 in accordance with an illustrative embodiment.
Figure 6:
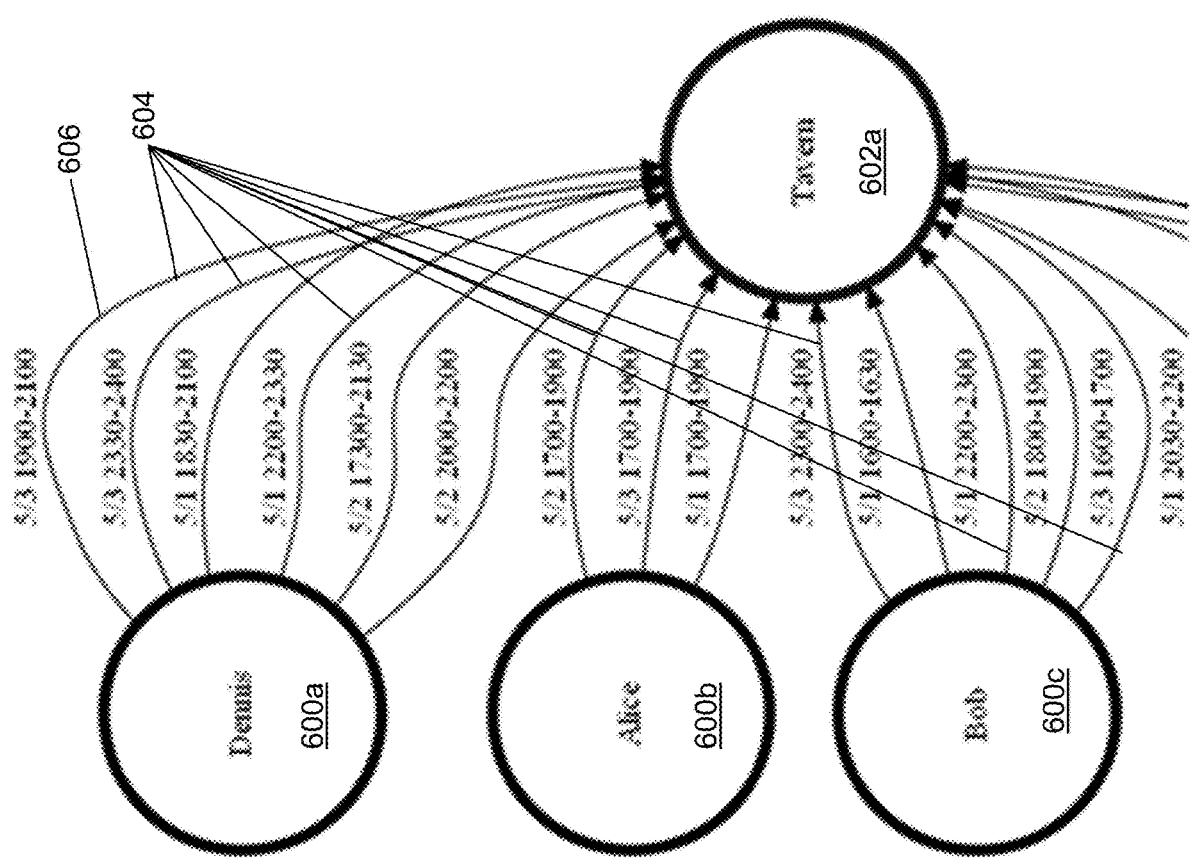
FIG. 6 depicts a portion of a first graph in accordance with an illustrative embodiment.

Merely for further illustration, referring to FIG. 5, example operations associated with identifying an overlap between a pair of start nodes at an end node are shown. More complex overlap query graph structures can be used to define the overlap. For example, an infection pathway query could involve four links between three start nodes and two end nodes to identify overlap based on that query structure as opposed to the simpler two start nodes linked to an end node described in FIG. 5 for illustration of overlap identification.

In an operation 500, an end node is selected from the end nodes of the graph for which overlap between end nodes are to be identified.

In an operation 502, a determination is made concerning whether a plurality of start nodes is connected to the selected end node. When a plurality of start nodes is connected to the selected end node, processing continues in an operation 506. When a plurality of start nodes is not connected to the selected end node, processing continues in an operation 504.

In operation 504, a next end node of the end nodes of the graph is selected, and processing continues in operation 502.

In operation 506, a first start node that is connected to the selected end node in the graph is selected.

In an operation 508, a second start node that is connected to the selected end node in the graph is selected.

In an operation 510, a determination is made concerning whether the link attribute values of the selected first start node and the selected second start node overlap. When an overlap is identified, processing continues in an operation 512. When an overlap is not identified, processing continues in an operation 514. For example, the link attribute values of the selected first start node and the selected second start node overlap when $\max(\text{link\_start}_1, \text{link\_start}_2) < \min(\text{link\_stop}_1, \text{link\_stop}_2)$, where $\text{link\_start}_1$ is the link start value for the selected first start node, $\text{link\_start}_2$ is the link start value for the selected second start node, $\text{link\_stop}_1$ is the link start value for the selected first end node, and $\text{link\_stop}_2$ is the link stop value for the selected second end node.

In operation 512, overlap data associated with the selected first start node and the selected second start node is stored to indicate a pair of start nodes that overlap at the selected end node. In an alternative embodiment, if the overlap data is a duplicate of data already stored, the pair of the selected first start node and the selected second start node may not be stored again regardless of whether the link attributes between each start node and the selected end node are the same. In another alternative embodiment, the pair of the selected first start node and the selected second start node may be stored if the previously stored pair has different link attributes. The selected first start node, the selected second start node, their respective link attribute values ($\text{link\_start}_1$, $\text{link\_start}_2$, $\text{link\_stop}_1$, $\text{link\_stop}_2$), and the selected end node may be stored depending on the embodiment. For example, a user may indicate which parameters are stored and compared to eliminate any duplicates or not.

In operation 514, a determination is made concerning whether there is another start node to select as the second start node. When there is another start node, processing continues in an operation 516. When there is not another start node, processing continues in an operation 518.

In operation 516, a next second start node that is connected to the selected end node in the graph is selected. For example, a third start node connected to the selected end node may be selected.

In operation 518, a determination is made concerning whether there is another start node to select as the first start node. When there is another start node, processing continues in an operation 520. When there is not another start node, processing continues in an operation 522. Unique pairs are selected as the first start node and the second start node of the plurality of start nodes connected to the selected end node. For example, if there are two start nodes connected to the selected end node, a first start node is compared to the second start node and there is not another first start node. As another example, if there are three start nodes connected to the selected end node, a first start node of the three start nodes is compared to each of the remaining two start nodes by selecting the second start node in operation 508 and by selecting the third start node as the next second start node in operation 516. The second start node of the three start nodes is compared to the third start node by selecting the second start node as the next first start node in operation 520 and by selecting the third start node as the second start node in operation 508 so that each unique combination is selected and compared for overlap in operations 506 through 520.

In operation 520, a next first start node that is connected to the selected end node in the graph is selected. For example, a second start node connected to the selected end node may be selected as the next first start node if there are more than two start nodes connected to the selected end node.

In operation 522, a determination is made concerning whether there is another end node to select as the end node. When there is another end node, processing continues in operation 504 to select the next end node of the graph. When there is not another end node, processing continues in an operation 524.

In operation 524, identifying overlapping start nodes of the graph is done. When the end nodes are split, the end nodes are typically connected to fewer start nodes reducing the looping and the number of overlap comparisons required in operation 510, which significantly reduces the required computing time as discussed further below.

Referring again to FIG. 2B, in an operation 260, the identified overlapping end nodes are output, for example, by storing in overlap dataset 126. For example, the pair of start nodes that overlap at an end node are output optionally with the end node and/or the link start value and the link stop value of each start node.

The denser an input graph is in operation 211, the greater the speed up in computing time results by splitting the end nodes into bins using any of operations 216 through 218, operations 222 through 246, or operations 248 through 256. For example, in an illustrative graph that included five start nodes and two end nodes with 26 links, 145 overlap comparisons were required without splitting. By splitting the end nodes of the illustrative graph using two-hour intervals, the split illustrative graph only required 19 overlap comparisons, which significantly reduced the computation time for identifying overlaps.

Figure 8A:
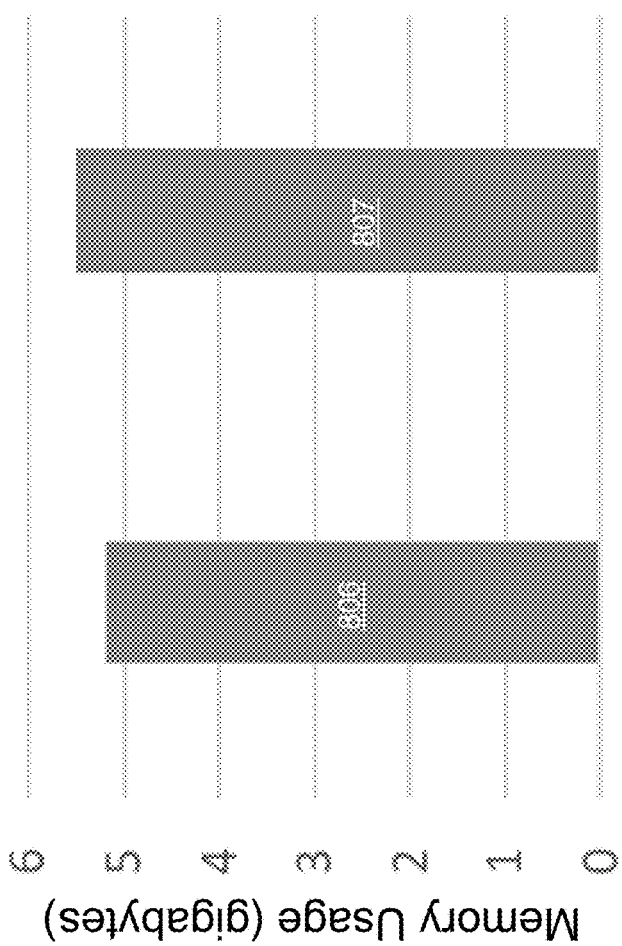
FIG. 8A shows a computing time comparison between two overlap detection methods using a first dataset in accordance with an illustrative embodiment.

As another example, a first dataset that included a10-day simulation with 1.4 million links was analyzed for overlap using 32 threads of a single computing device and the PatternMatch statement of the Network procedure of SAS® Visual Data Mining and Machine Learning. Referring to FIG. 8A, computing time comparisons are shown using the first dataset in accordance with an illustrative embodiment. A CPU time is shown by a first bar 800 without splitting (using the graph defined in operation 211). An algorithm time is shown by a second bar 801 without splitting (using the graph defined in operation 211). A wall clock time is shown by a third bar 802 without splitting (using the graph defined in operation 211). A CPU time is shown by a fourth bar 803 with splitting. An algorithm time is shown by a fifth bar 804 with splitting. A wall clock time is shown by a sixth bar 805 with splitting. Bins were defined with a fixed bin width of two-hours. Determining overlaps with splitting the graph was over 10 times faster than determining overlaps without splitting the graph.

Figure 8B:
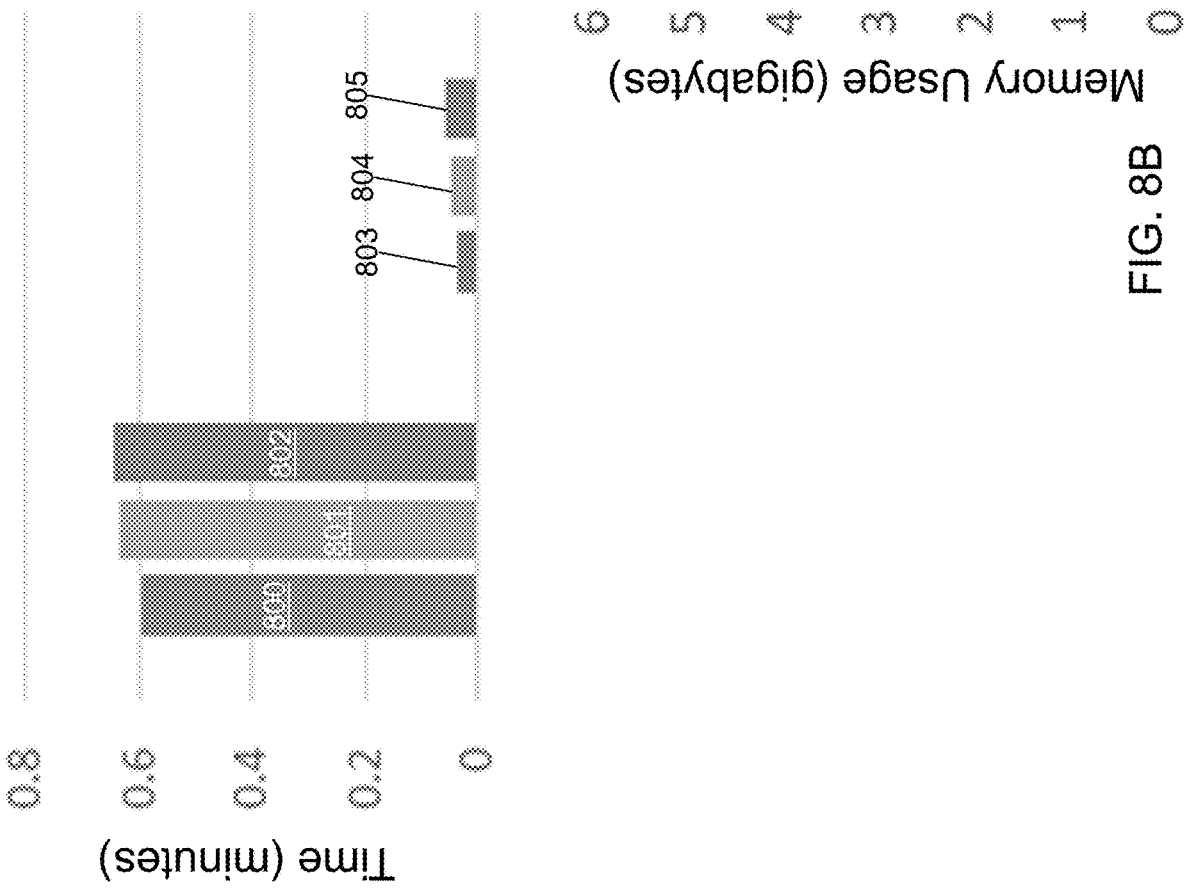
FIG. 8B shows a memory usage comparison between the two overlap detection methods using the first dataset in accordance with an illustrative embodiment.

Referring to FIG. 8B, a peak memory usage comparison is shown using the first dataset in accordance with an illustrative embodiment. A peak memory consumption is shown by a seventh bar 806 without splitting (using the graph defined in operation 211). A peak memory consumption is shown by an eighth bar 807 with splitting. Seventh bar 806 indicates a value of 5.199 GB, and eighth bar 807 indicates a value of 5.517 GB. Thus, the memory usage is comparable with a 10 times speedup in computation time using splitting.

As another example, a second dataset that included a 30-day simulation with 4.3 million links was analyzed for overlap using 32 threads of a single computing device and the PatternMatch statement of the Network procedure of SAS® Visual Data Mining and Machine Learning. Referring to FIG. 8C, computing time comparisons are shown using the second dataset in accordance with an illustrative embodiment. A CPU time is shown by a first bar 810 without splitting (using the graph defined in operation 211). An algorithm time is shown by a second bar 811 without splitting (using the graph defined in operation 211). A wall clock time is shown by a third bar 812 without splitting (using the graph defined in operation 211). A CPU time is shown by a fourth bar 813 with splitting. An algorithm time is shown by a fifth bar 814 with splitting. A wall clock time is shown by a sixth bar 815 with splitting. Bins were defined with a fixed bin width of two-hours. Determining overlaps with splitting the graph was over 20 times faster than determining overlaps without splitting the graph.

Figure 8D:
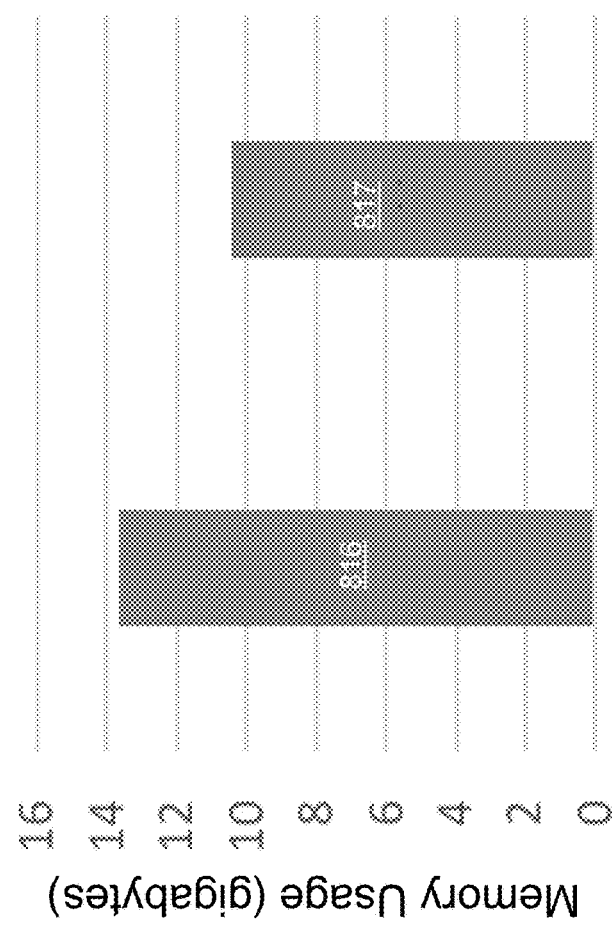
FIG. 8D shows the memory usage comparison between the two overlap detection methods using the second dataset in accordance with an illustrative embodiment.
Figure 8C:
FIG. 8C shows the computing time comparison between the two overlap detection methods using a second dataset in accordance with an illustrative embodiment.
Figure 8E:
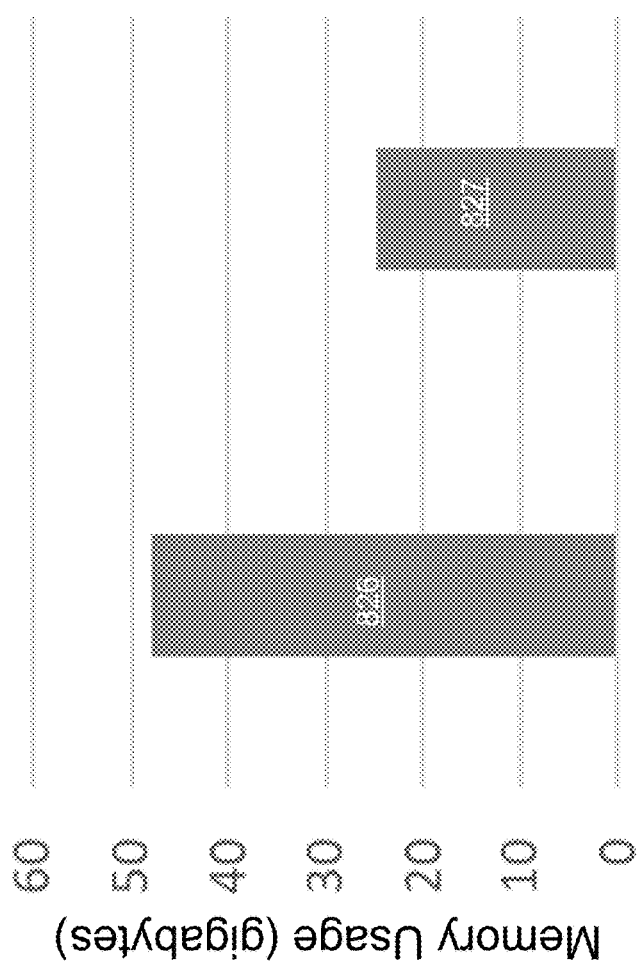
FIG. 8E shows the computing time comparison between the two overlap detection methods using a third dataset in accordance with an illustrative embodiment.

Referring to FIG. 8D, a peak memory usage comparison is shown using the second dataset in accordance with an illustrative embodiment. A peak memory consumption is shown by a seventh bar 816 without splitting (using the graph defined in operation 211). A peak memory consumption is shown by an eighth bar 817 with splitting. Seventh bar 816 indicates a value of 13.663 GB, and eighth bar 817 indicates a value of 10.423 GB. Thus, the memory usage is much lower with a 20 times speedup using splitting.

As another example, a third dataset that included a 90-day simulation with 13 million links was analyzed for overlap using 32 threads of a single computing device and the PatternMatch statement of the Network procedure of SAS® Visual Data Mining and Machine Learning. Referring to FIG. 8C, a computing time comparison is shown using the third dataset in accordance with an illustrative embodiment. A CPU time is shown by a first bar 820 without splitting (using the graph defined in operation 211). An algorithm time is shown by a second bar 821 without splitting (using the graph defined in operation 211). A wall clock time is shown by a third bar 822 without splitting (using the graph defined in operation 211). A CPU time is shown by a fourth bar 823 with splitting. An algorithm time is shown by a fifth bar 824 with splitting. A wall clock time is shown by a sixth bar 825 with splitting. Bins were defined with a fixed bin width of two-hours. Determining overlaps with splitting the graph was over 25 times faster than determining overlaps without splitting the graph.

Figure 8F:
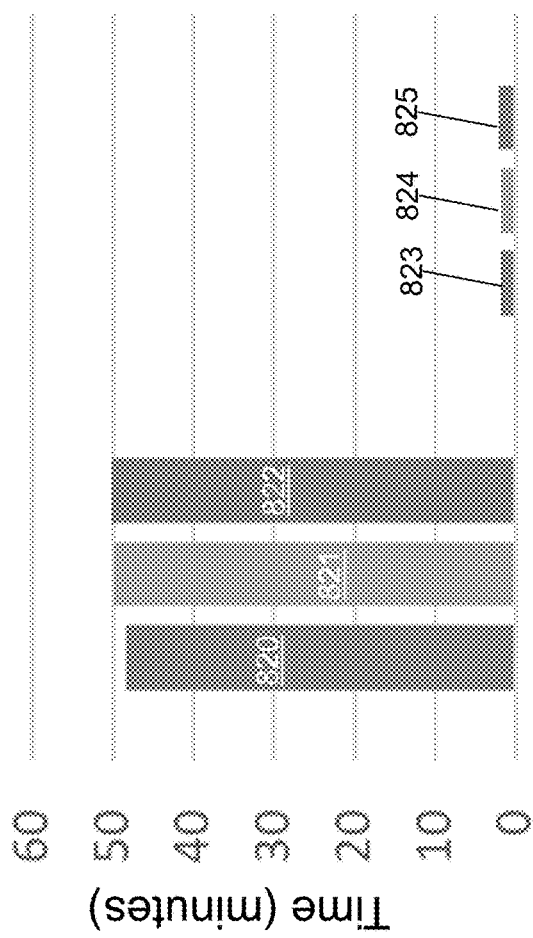
FIG. 8F shows the memory usage comparison between the two overlap detection methods using the third dataset in accordance with an illustrative embodiment.

Referring to FIG. 8F, a peak memory usage comparison is shown using the third dataset in accordance with an illustrative embodiment. A peak memory consumption is shown by a seventh bar 826 without splitting (using the graph defined in operation 211). A peak memory consumption is shown by an eighth bar 827 with splitting. Seventh bar 826 indicates a value of 48 GB, and eighth bar 827 indicates a value of 24.883 GB. Thus, the memory usage is approximately half with a 25 times speedup using splitting.

Figure 9:
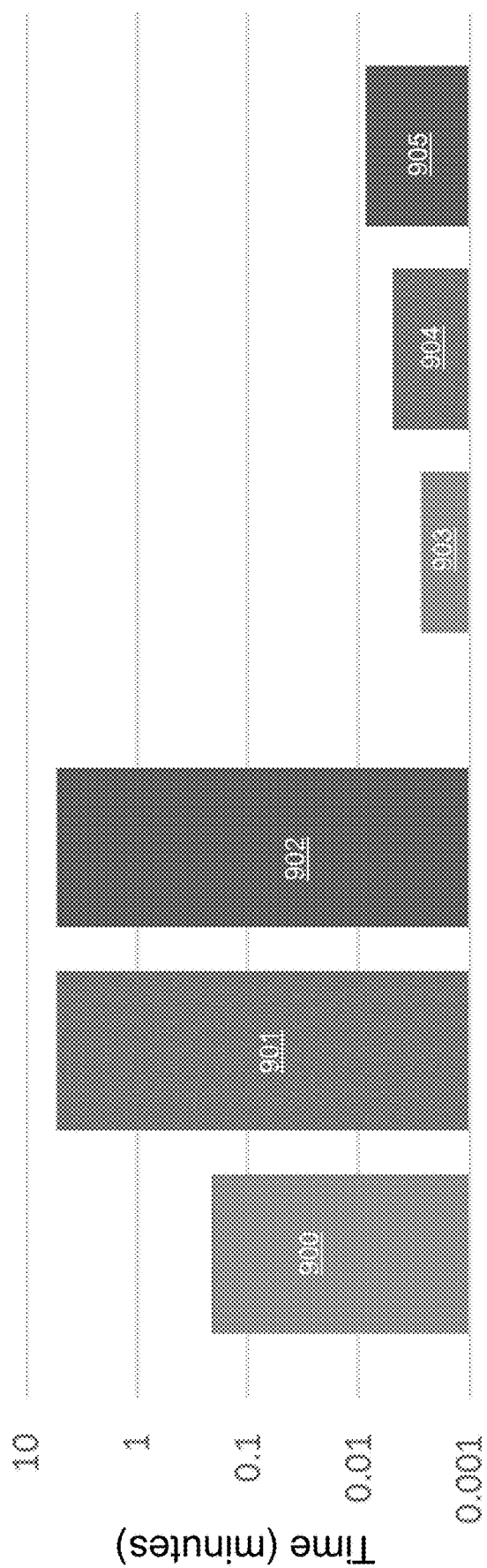
FIG. 9 shows the computing time comparison between the two overlap detection methods using a fourth dataset in accordance with an illustrative embodiment.

As another example, a fourth dataset that included anonymized hospital date was analyzed for overlap using 32 threads of a single computing device and the PatternMatch statement of the Network procedure of SAS® Visual Data Mining and Machine Learning. The fourth dataset included 32,000 links, 3,119 patients, and 49 rooms and was gathered over a 60-day time span. Each link represented occupancy of a hospital room by a patient. Referring to FIG. 9, computing time comparisons are shown using the fourth dataset in accordance with an illustrative embodiment. A CPU time is shown by a first bar 900 without splitting (using the graph defined in operation 211). An algorithm time is shown by a second bar 901 without splitting (using the graph defined in operation 211). A wall clock time is shown by a third bar 902 without splitting (using the graph defined in operation 211). A CPU time is shown by a fourth bar 903 with splitting. An algorithm time is shown by a fifth bar 904 with splitting. A wall clock time is shown by a sixth bar 905 with splitting. Bins were defined with a fixed bin width of two-hours. Determining overlaps with splitting the graph was over 600 times faster than determining overlaps without splitting the graph.

Using the fourth dataset, a more complex overlap query graph structure was also tested. The more complex overlap query applied the infection pathway query that included four links between three start nodes and two end nodes. Without splitting, a wall clock time was 18 minutes and 18 seconds. With splitting, a wall clock time was 0.13 seconds. Without splitting, a peak memory consumption was 2.077 GB. With splitting, a peak memory consumption was 2.419 GB.

Using the fourth dataset, an even more complex overlap query graph structure was also tested that applied an infection pathway query that included six links between four start nodes and three end nodes. Without splitting, a wall clock time was not recorded because the execution was stopped after four hours. With splitting, a wall clock time was 18.54 seconds. Without splitting, a peak memory consumption was 2.092 GB. With splitting, a peak memory consumption was 2.036 GB.

The results show that the denser an input graph and/or the more complex the overlap query graph structure, the more significant the decrease in computing time achieved by splitting the end nodes into bins. The peak memory consumption ranges from similar in comparison to without splitting to much less also. As a result, splitting the graph before application of the overlap query graph structure to detect overlaps allows overlap queries to scale to much larger graph instances while maintaining a reasonable computation time and peak memory usage.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    read start node values from a dataset to define a plurality of start nodes;
    read end node values from the dataset to define a plurality of end nodes;
    define a plurality of link attributes associated with each connection between a start node and an end node based on a predefined link start variable and a predefined link stop variable read from the dataset;
    define a bin start value as a predefined match link start value and a bin stop value as a predefined match link stop value, wherein defining the bin start value and the bin stop value is based on an input bin option;
    define a bin width value as a difference between the predefined match link stop value and the predefined match link start value;
    split the plurality of end nodes based on the defined bin start value and the defined bin stop value to define a second plurality of end nodes;
    initialize a previous link counter as a number of links between the plurality of start nodes and the second plurality of end nodes;
    determine a previous average degree value as an average degree value based on the number of links;
    (A) reduce the bin width value using a predefined bin width reduction factor value;
    (B) define a new bin start value and a new bin stop value for each bin of a plurality of bins based on the reduced bin width value;
    (C) split the second plurality of end nodes based on the defined new bin start value and the defined new bin stop value for each bin of the plurality of bins;
    (D) store a current link counter as the number of links between the plurality of start nodes and the split, second plurality of end nodes;
    (E) determine a current average degree value based on the current link counter;
    repeat (A) through (E) until a stop criterion is satisfied, wherein, on a next iteration of (A) through (E), the previous link counter is updated with the stored current link counter, and the previous average degree value is updated with the determined current average degree value, wherein, after the stop criterion is satisfied, the defined bin start value is the defined new bin start value, the defined bin stop value is the defined new bin stop value, and the second plurality of end nodes is the split, second plurality of end nodes;
    identify each start node of the plurality of start nodes that is connected to each end node of the second plurality of end nodes based on the respective link attributes of the defined plurality of link attributes;
    identify overlapping start nodes of the plurality of start nodes that overlap at an end node of the second plurality of end nodes based on a predefined overlap query graph, wherein the predefined overlap query graph defines a connectivity to identify between the start node and the end node; and
    output the identified overlapping start nodes as a response to the predefined overlap query graph.

2. The non-transitory computer-readable medium of claim 1, wherein a plurality of pairs of start nodes that overlap at the end node are identified based on the defined plurality of link attributes.

3. The non-transitory computer-readable medium of claim 1, wherein the bin start value and the bin stop value each represent a time value.

4. The non-transitory computer-readable medium of claim 1, wherein each start node of the plurality of start nodes represents an entity.

5. The non-transitory computer-readable medium of claim 1, wherein each start node of the plurality of start nodes represents a person.

6. The non-transitory computer-readable medium of claim 1, wherein each end node of the plurality of end nodes represents an entity.

7. The non-transitory computer-readable medium of claim 1, wherein each end node of the plurality of end nodes represents a location.

8. The non-transitory computer-readable medium of claim 1, wherein the end node associated with the identified overlapping start nodes is further output.

9. The non-transitory computer-readable medium of claim 1, wherein a link start value and a link stop value associated with the identified overlapping start nodes are further output.

10. The non-transitory computer-readable medium of claim 1, wherein the current average degree value is determined as the current link counter divided by a number of the plurality of start nodes and a number of the split, second plurality of end nodes.

11. The non-transitory computer-readable medium of claim 1, wherein the stop criterion is satisfied when $(D_p-D_n)/D_p < \rho(L_n-L_p)/L_p$, where $D_p$ is the previous average degree value, $D_n$ is the determined current average degree value, $\rho$ is a predefined tuning parameter, $L_n$ is the stored current link counter, and $L_p$ is the previous link counter.

12. The non-transitory computer-readable medium of claim 1, wherein defining the new bin start value and the new bin stop value comprises:
    determine a number of bins of the plurality of bins based on a difference between the predefined match link stop value and the predefined match link start value divided by the reduced bin width value;
    define a first bin start value as the predefined match link start;
    define a first bin stop value as the predefined match link start value plus the reduced bin width value;
    initialize a bin counter;
    (F) define the bin start value for a bin associated with the bin counter based on the bin stop value for a previous bin;
    (G) define the bin stop value for the bin associated with the bin counter based on the bin start value for the bin plus the reduced bin width value;
    (H) increment the bin counter; and
    repeat (F) through (H) until the bin counter is greater than the determined number of bins.

13. The non-transitory computer-readable medium of claim 1, wherein splitting the second plurality of end nodes comprises:
    (F) select a next end node from the second plurality of end nodes;
    (G) create a third plurality of end nodes from the selected next end node, wherein each end node of the third plurality of end nodes has an associated node start value and an associated node stop value based on the defined bin start value and the defined bin stop value of each bin of the plurality of bins;

(H) select the start node of the plurality of start nodes that is connected to the selected next end node;

(I) select a new end node from the created third plurality of end nodes based on an overlap between the link start value and the link stop value associated with the selected start node and the associated node start value and the associated node stop value of the new end node;

(J) add the selected new end node to the second plurality of end nodes in association with the selected start node, the link start value, and the link stop value;

(K) repeat (H) through (J) until each start node connected to the selected end node is selected in (H); and repeat (F) through (K) until each end node of the second plurality of end nodes is selected in (F).

14. The non-transitory computer-readable medium of claim 1, wherein a pair of start nodes that overlap based on a comparison between a link start value and a link stop value associated with a respective pair of end nodes is used as the overlap query graph structure.

15. The non-transitory computer-readable medium of claim 14, wherein identifying the pair of start nodes associated with the respective pair of end nodes of the second plurality of end nodes that overlap comprises:

(F) select a next end node from the second plurality of end nodes;

(G) when there are a plurality of start nodes connected to the selected next end node, (AA) select a first start node of the plurality of start nodes connected to the selected next end node;

(AB) select a second start node of the plurality of start nodes connected to the selected next end node;

(AC) determine if there is a link overlap between the selected first start node and the selected second start node by comparing a link start value and a link stop value of the selected first start node to a link start value and a link stop value of the selected second start node;

(AD) when there is a link overlap based on the determination, identify the first start node and the second start node as the pair of start nodes;

(AE) repeat (AB) through (AD) until each remaining start node of the plurality of start nodes connected to the selected next end node is selected in (AB);

(AF) repeat (AA) through (AE) until each remaining start node of the plurality of start nodes connected to the selected next end node is selected in (AB), wherein in (AB), the selected second start node is a next start node relative to the first start node selected in (AA); and (AG) repeat (AA) through (AF) until each remaining start node of the plurality of start nodes connected to the selected next end node is selected in (AA), wherein in (AB), the selected second start node is a next start node relative to the first start node selected in (AA); and repeat (F) and (G) until each remaining end node of the second plurality of end nodes is selected in (F).

16. The non-transitory computer-readable medium of claim 1, wherein the plurality of start nodes and the plurality of end nodes define a directed graph that includes a link start value and a link stop value defined for each link between a start node and an end node.

17. The non-transitory computer-readable medium of claim 1, wherein the plurality of start nodes and the second plurality of end nodes are further output with each respective link start value and each respective link stop value.

18. The non-transitory computer-readable medium of claim 1, further comprising computer-readable instructions that cause the computing device to adjust the defined plurality of link attributes based on the second plurality of end nodes.

19. The non-transitory computer-readable medium of claim 18, wherein the plurality of start nodes and the second plurality of end nodes are further output with each respective adjusted link start value and each respective adjusted link stop value.

20. A non-transitory computer-readable medium having stored thereon computer-readable instructions that when executed by a computing device cause the computing device to:

read start node values from a dataset to define a plurality of start nodes;

read end node values from the dataset to define a plurality of end nodes;

define a plurality of link attributes associated with each connection between a start node and an end node based on a predefined link start variable and a predefined link stop variable read from the dataset;

define a bin start value and a bin stop value for each bin of a plurality of bins, wherein defining the bin start value and the bin stop value is based on an input bin option;

split the plurality of end nodes based on the defined bin start value and the defined bin stop value of each bin of the predefined plurality of bins, wherein splitting the plurality of end nodes comprises (A) select a next end node from the plurality of end nodes;

(B) create a third plurality of end nodes from the selected next end node, wherein each end node of the third plurality of end nodes has an associated node start value and an associated node stop value based on the defined bin start value and the defined bin stop value of each bin of the plurality of bins;

(C) select a next start node of the plurality of start nodes that is connected to the selected end node;

(D) select a new end node from the created third plurality of end nodes based on an overlap between the link start value and the link stop value associated with the selected next start node and the associated node start value and the associated node stop value of the new end node;

(E) add the selected new end node to a second plurality of end nodes in association with the selected next start node, the link start value, and the link stop value;

(F) repeat (C) through (E) until each start node connected to the selected end node is selected in (C); and repeat (A) through (F) until each end node of the second plurality of end nodes is selected in (A);

identify each start node of the plurality of start nodes that is connected to each end node of the second plurality of end nodes based on the respective link attributes of the defined plurality of link attributes;

identify overlapping start nodes of the plurality of start nodes that overlap at an end node of the second plurality of end nodes based on a predefined overlap query graph, wherein the predefined overlap query graph defines a connectivity to identify between the start node and the end node; and output the identified overlapping start nodes as a response to the predefined overlap query graph.

21. A computing device comprising:
a processor; and
a non-transitory computer-readable medium operably coupled to the processor, the computer-readable medium having computer-readable instructions stored thereon that, when executed by the processor, cause the computing device to
read start node values from a dataset to define a plurality of start nodes;
read end node values from the dataset to define a plurality of end nodes;
define a plurality of link attributes associated with each connection between a start node and an end node based on a predefined link start variable and a predefined link stop variable read from the dataset;
define a bin start value as a predefined match link start value and a bin stop value as a predefined match link stop value, wherein defining the bin start value and the bin stop value is based on an input bin option;
define a bin width value as a difference between the predefined match link stop value and the predefined match link start value;
split the plurality of end nodes based on the defined bin start value and the defined bin stop value to define a second plurality of end nodes;
initialize a previous link counter as a number of links between the plurality of start nodes and the second plurality of end nodes;
determine a previous average degree value as an average degree value based on the number of links;
(A) reduce the bin width value using a predefined bin width reduction factor value;
(B) define a new bin start value and a new bin stop value for each bin of a plurality of bins based on the reduced bin width value;
(C) split the second plurality of end nodes based on the defined new bin start value and the defined new bin stop value for each bin of the plurality of bins;
(D) store a current link counter as the number of links between the plurality of start nodes and the split, second plurality of end nodes;
(E) determine a current average degree value based on the current link counter;
repeat (A) through (E) until a stop criterion is satisfied, wherein, on a next iteration of (A) through (E), the previous link counter is updated with the stored current link counter, and the previous average degree value is updated with the determined current average degree value, wherein, after the stop criterion is satisfied, the defined bin start value is the defined new bin start value, the defined bin stop value is the defined new bin stop value, and the second plurality of end nodes is the split, second plurality of end nodes;
identify each start node of the plurality of start nodes that is connected to each end node of the second plurality of end nodes based on the respective link attributes of the defined plurality of link attributes;
identify overlapping start nodes of the plurality of start nodes that overlap at an end node of the second plurality of end nodes based on a predefined overlap query graph, wherein the predefined overlap query graph defines a connectivity to identify between a start node and the end node; and
output the identified overlapping start nodes as a response to the predefined overlap query graph.

22. A method of determining a response to a query, the method comprising:
reading, by a computing device, start node values from a dataset to define a plurality of start nodes;
reading, by the computing device, end node values from the dataset to define a plurality of end nodes;
defining, by the computing device, a plurality of link attributes associated with each connection between a start node and an end node based on a predefined link start variable and a predefined link stop variable read from the dataset;
defining, by the computing device, a bin start value as a predefined match link start value and a bin stop value as a predefined match link stop value, wherein defining the bin start value and the bin stop value is based on an input bin option;
defining, by the computing device, a bin width value as a difference between the predefined match link stop value and the predefined match link start value;
splitting, by the computing device, the plurality of end nodes based on the defined bin start value and the defined bin stop value to define a second plurality of end nodes;
initializing, by the computing device, a previous link counter as a number of links between the plurality of start nodes and the second plurality of end nodes;
determining, by the computing device, a previous average degree value as an average degree value based on the number of links;
(A) reducing, by the computing device, the bin width value using a predefined bin width reduction factor value;
(B) defining, by the computing device, a new bin start value and a new bin stop value for each bin of a plurality of bins based on the reduced bin width value;
(C) splitting, by the computing device, the second plurality of end nodes based on the defined new bin start value and the defined new bin stop value for each bin of the plurality of bins;
(D) storing, by the computing device, a current link counter as the number of links between the plurality of start nodes and the split, second plurality of end nodes;
(E) determining, by the computing device, a current average degree value based on the current link counter;
repeating, by the computing device, (A) through (E) until a stop criterion is satisfied, wherein, on a next iteration of (A) through (E), the previous link counter is updated with the stored current link counter, and the previous average degree value is updated with the determined current average degree value, wherein, after the stop criterion is satisfied, the defined bin start value is the defined new bin start value, the defined bin stop value is the defined new bin stop value, and the second plurality of end nodes is the split, second plurality of end nodes;
identifying, by the computing device, each start node of the plurality of start nodes that is connected to each end node of the second plurality of end nodes based on the respective link attributes of the defined plurality of link attributes;
identifying, by the computing device, overlapping start nodes of the plurality of start nodes that overlap at an end node of the second plurality of end nodes based on a predefined overlap query graph, wherein the predefined overlap query graph defines a connectivity to identify between a start node and the end node; and outputting, by the computing device, the identified overlapping start nodes as a response to the predefined overlap query graph.

23. The method of claim 22, wherein the current average degree value is determined as the current link counter divided by a number of the plurality of start nodes and a number of the split, second plurality of end nodes.

24. The method of claim 22, wherein the stop criterion is satisfied when $(D_p-D_n)/D_p < \rho(L_n-L_p)/L_p$, where $D_p$ is the previous average degree value, $D_n$ is the determined current average degree value, $\rho$ is a predefined tuning parameter, $L_n$ is the stored current link counter, and $L_p$ is the previous link counter.

25. The method of claim 22, wherein defining the new bin start value and the new bin stop value comprises:
  determine a number of bins of the plurality of bins based on a difference between the predefined match link stop value and the predefined match link start value divided by the reduced bin width value;
  define a first bin start value as the predefined match link start;
  define a first bin stop value as the predefined match link start value plus the reduced bin width value;
  initialize a bin counter;
  (F) define the bin start value for a bin associated with the bin counter based on the bin stop value for a previous bin;
  (G) define the bin stop value for the bin associated with the bin counter based on the bin start value for the bin plus the reduced bin width value;
  (H) increment the bin counter; and
  repeat (F) through (H) until the bin counter is greater than the determined number of bins.

26. The method of claim 22, wherein splitting the second plurality of end nodes comprises:
  (F) select a next end node from the second plurality of end nodes;
  (G) create a third plurality of end nodes from the selected next end node, wherein each end node of the third plurality of end nodes has an associated node start value and an associated node stop value based on the defined bin start value and the defined bin stop value of each bin of the plurality of bins;
  (H) select the start node of the plurality of start nodes that is connected to the selected next end node;
  (I) select a new end node from the created third plurality of end nodes based on an overlap between the link start value and the link stop value associated with the selected start node and the associated node start value and the associated node stop value of the new end node;
  (J) add the selected new end node to the second plurality of end nodes in association with the selected start node, the link start value, and the link stop value;
  (K) repeat (H) through (J) until each start node connected to the selected end node is selected in (H); and
  repeat (F) through (K) until each end node of the second plurality of end nodes is selected in (F).

27. The method of claim 22, wherein a pair of start nodes that overlap based on a comparison between a link start value and a link stop value associated with a respective pair of end nodes is used as the overlap query graph structure.

28. The method of claim 27, wherein identifying the pair of start nodes associated with the respective pair of end nodes of the second plurality of end nodes that overlap comprises:
  (F) select a next end node from the second plurality of end nodes;
  (G) when there are a plurality of start nodes connected to the selected next end node,
    (AA) select a first start node of the plurality of start nodes connected to the selected next end node;
    (AB) select a second start node of the plurality of start nodes connected to the selected next end node;
    (AC) determine if there is a link overlap between the selected first start node and the selected second start node by comparing a link start value and a link stop value of the selected first start node to a link start value and a link stop value of the selected second start node;
    (AD) when there is a link overlap based on the determination, identify the first start node and the second start node as the pair of start nodes;
    (AE) repeat (AB) through (AD) until each remaining start node of the plurality of start nodes connected to the selected next end node is selected in (AB);
    (AF) repeat (AA) through (AE) until each remaining start node of the plurality of start nodes connected to the selected next end node is selected in (AB), wherein in (AB), the selected second start node is a next start node relative to the first start node selected in (AA); and
    (AG) repeat (AA) through (AF) until each remaining start node of the plurality of start nodes connected to the selected next end node is selected in (AA), wherein in (AB), the selected second start node is a next start node relative to the first start node selected in (AA); and
  repeat (F) and (G) until each remaining end node of the second plurality of end nodes is selected in (F).

29. The method of claim 22, wherein the plurality of start nodes and the plurality of end nodes define a directed graph that includes a link start value and a link stop value defined for each link between a start node and an end node.

30. A non-transitory computer-readable medium having stored thereon computer-readable instructions that when executed by a computing device cause the computing device to:
  read start node values from a dataset to define a plurality of start nodes;
  read end node values from the dataset to define a plurality of end nodes;
  define a plurality of link attributes associated with each connection between a start node and an end node based on a predefined link start variable and a predefined link stop variable read from the dataset;
  define a bin start value and a bin stop value for each bin of a plurality of bins, wherein defining the bin start value and the bin stop value is based on an input bin option;
  split the plurality of end nodes based on the defined bin start value and the defined bin stop value of each bin of the plurality of bins to define a second plurality of end nodes;
  identify each start node of the plurality of start nodes that is connected to each end node of the second plurality of end nodes based on the respective link attributes of the defined plurality of link attributes;
  identify each pair of start nodes of the plurality of start nodes that overlap at a respective end node of the second plurality of end nodes by
    (A) selecting a next end node from the second plurality of end nodes;
    (B) when there is a plurality of start nodes connected to the selected next end node, (AA) selecting a first start node of the plurality of start nodes connected to the selected next end node;
(AB) selecting a second start node of the plurality of start nodes connected to the selected next end node;
(AC) determining if there is a link overlap between the selected first start node and the selected second start node by comparing a link start value and a link stop value of the selected first start node to a link start value and a link stop value of the selected second start node;
(AD) when there is a link overlap based on the determination, identifying the first start node and the second start node as the pair of start nodes;
(AE) repeating (AB) through (AD) until each remaining start node of the plurality of start nodes connected to the selected next end node is selected in (AB);
(AF) repeating (AA) through (AE) until each remaining start node of the plurality of start nodes connected to the selected next end node is selected in (AB), wherein in (AB), the selected second start node is a next start node relative to the first start node selected in (AA); and
(AG) repeating (AA) through (AF) until each remaining start node of the plurality of start nodes connected to the selected next end node is selected in (AA), wherein in (AB), the selected second start node is a next start node relative to the first start node selected in (AA); and repeating (A) and (B) until each remaining end node of the second plurality of end nodes is selected in (A); and output each pair of start nodes identified in (AD).

* * * * *